INVENTOR
Fred Krahulec
By
Mason, Kolehmainen, Rathburn & Wyss - Attys

June 10, 1958 F. KRAHULEC 2,838,359

SYSTEM AND APPARATUS FOR RECORDING THE LISTENING HABITS OF WAVE SIGNAL RECEIVER USERS

Filed March 2, 1950

10 Sheets-Sheet 2

INVENTOR
Fred Krahulec
By
Mason, Kolehmainen, Rathburn & Wyss - Attys

INVENTOR
Fred Krahulec
BY
Mason, Kolehmainen, Rathburn & Wyss - Att'ys

INVENTOR
Fred Krahulec
By
Mason, Kolehmainen, Rathburn & Wyss Attys

June 10, 1958 F. KRAHULEC 2,838,359

SYSTEM AND APPARATUS FOR RECORDING THE LISTENING HABITS OF WAVE SIGNAL RECEIVER USERS

Filed March 2, 1950 10 Sheets-Sheet 5

INVENTOR
Fred Krahulec
By
Mason, Kolehmainen, Rathburn & Wyss — Att'ys

INVENTOR
Fred Krahulec
By
Mason, Kolehmainen, Rathburn & Wyss Att'ys

INVENTOR
Fred Krahulec
By
Mason, Kolehmainen, Rathburn & Wyss - Attys

June 10, 1958 F. KRAHULEC 2,838,359

SYSTEM AND APPARATUS FOR RECORDING THE LISTENING HABITS OF WAVE SIGNAL RECEIVER USERS

Filed March 2, 1950

10 Sheets-Sheet 8

INVENTOR

Fred Krahulec

By

Mason, Kolehmainen, Rathburn & Wyss - Att'ys

June 10, 1958 F. KRAHULEC 2,838,359

SYSTEM AND APPARATUS FOR RECORDING THE LISTENING HABITS OF WAVE SIGNAL RECEIVER USERS

Filed March 2, 1950

10 Sheets-Sheet 9

INVENTOR

Fred Krahulec

By – Mason, Kolehmainen, Rathburn & Wyss – Att'ys

June 10, 1958 F. KRAHULEC 2,838,359

SYSTEM AND APPARATUS FOR RECORDING THE LISTENING HABITS OF WAVE SIGNAL RECEIVER USERS

Filed March 2, 1950

10 Sheets-Sheet 10

INVENTOR
Fred Krahulec

By
Mason, Kolehmainen, Rathburn & Wyss – Att'ys

United States Patent Office 2,838,359

Patented June 10, 1958

2,838,359

SYSTEM AND APPARATUS FOR RECORDING THE LISTENING HABITS OF WAVE SIGNAL RECEIVER USERS

Fred Krahulec, Skokie, Ill., assignor to A. C. Nielsen Company, Chicago, Ill., a corporation of Illinois Application March 2, 1950, Serial No. 147,302

17 Claims. (Cl. 346—22)

The present invention relates to a system and apparatus for recording the listening habits or viewing habits in the case of television, of wave signal receiver users.

Instrumented methods of determining the listening habits, or viewing habits in the case of television, of wave signal receiver users generally employ a recording device operating in conjunction with one or more receivers in the home of each collaborator to record as a function of time the wave signal transmitters to which the receiver is tuned for signal reception, whereupon this recorded information is made available to an analysis or research organization for conversion to useable data with reference to radio advertising and the like. The collaborator homes are chosen on a nationwide basis so as to be truly representative of the radio and television audiences throughout the area under consideration as, for example, the entire United States. The usual device of this character embodies facilities for driving a recording element such as a recording tape or the like at a constant speed and recording on this tape the various stations to which the receiver is tuned. In one recording arrangement extensively used heretofore the position of the record indications transversely of the tape are representative of the particular stations to which the associated receiver or receivers are tuned.

For the purpose of eliminating a substantial cost factor in the sampling process of getting the recorded information to the analysis organization at regular and frequent intervals, it has been suggested to employ mailable magazines containing the recording or record receiving element which magazines can readily be associated with or removed from the recorder by the collaborator in whose home the receiver or receivers to be monitored are located. By having the collaborator replace the magazines and mail them directly to the analysis organization a substantial cost reduction is occasioned since fewer field men are required and hence their salaries and expenses are effectively reduced, particularly when such recording devices are disposed in widely scattered areas. As has been pointed out in copending Rahmel application, Serial No. 762,962, filed July 23, 1947 (now Patent No. 2,660,508), and assigned to the same assignee as the present application, where mailable magazines are employed it is essential that some independent and more or less foolproof time information be applied to the record while it is being made, which time information will permit the analysis organization accurately to orientate the record with respect to a predetermined calendar period.

It would be desirable to provide an improved recording device and apparatus for recording the desired record information in a manner which lends itself more completely to automatic operation from the standpoint of converting the recorded data to a final statistical analysis. Such automatic operation might comprise among other things automatic devices for converting information recorded on the recording or record receiving element to information which can be directly fed to an electronic digital computer or similar apparatus. It would furthermore be desirable to supply the record information to the recording element in a manner such that it may also be read with speed and ease with conventional means. Conventionally the position of the record traces transversely of the recording element has been directly indicative of the particular station to which the receiver is tuned. It will be apparent that having record indications transversely of a record receiving element or tape, the positions of which are directly indicative of the station to which the receiver is tuned, does not lend itself readily to high speed automatic reading. Accordingly, it would be desirable to provide an arrangement of recording such information which would more readily lend itself to automatic decoding.

It is an object of the present invention to provide a new and improved system and apparatus for recording the listening or viewing habits of wave signal receiver users.

It is another object of the present invention to provide a new and improved recording device of the type referred to above which is simple and compact and which is substantially foolproof in operation.

It is still another object of the present invention to provide a compact and simple magazine for a recorder, which is particularly well adapted for mailing from the standpoint of size and weight, and which is furthermore well adapted for handling by an unskilled person.

It is a further object of the present invention to provide a new and improved magazine type of recording device provided with means for insuring replacement thereof by the collaborator.

A still further object of the present invention is to provide a new and improved recording device in which record information is applied to a recording element in the form of a simple binary code which can readily be read by automatic decoding apparatus and which at the same time can be visually read in a simple manner whereby one can tell at a glance what the tuning condition of the monitored receiver has been.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Figs. 1*a*, 1*b* and 1*c* together are a schematic representation of a system embodying the present invention;

Fig. 14 shows the complete structure;

Fig. 15 shows the complete structure;

Figure 1A:
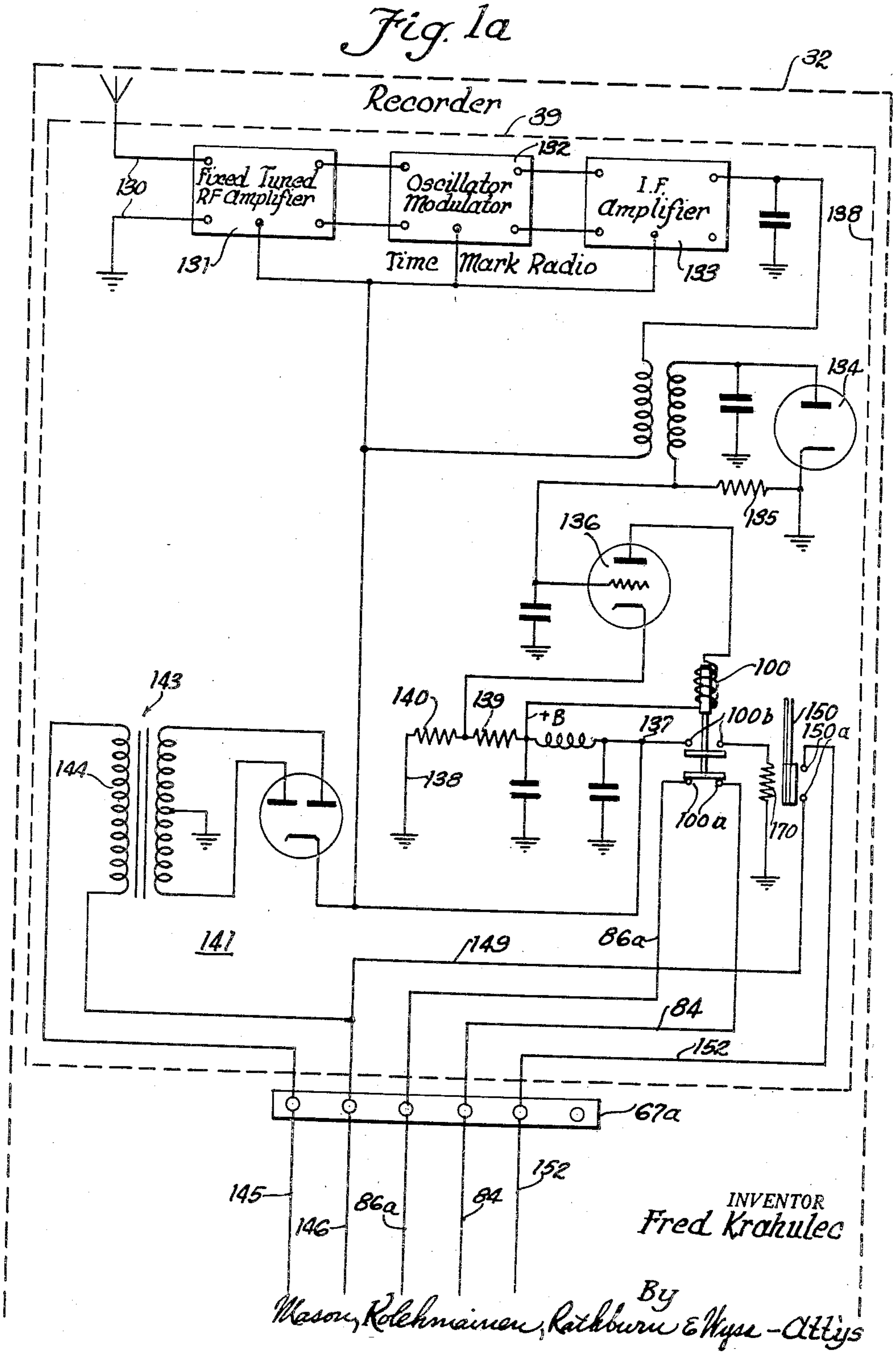
Figure 1B:
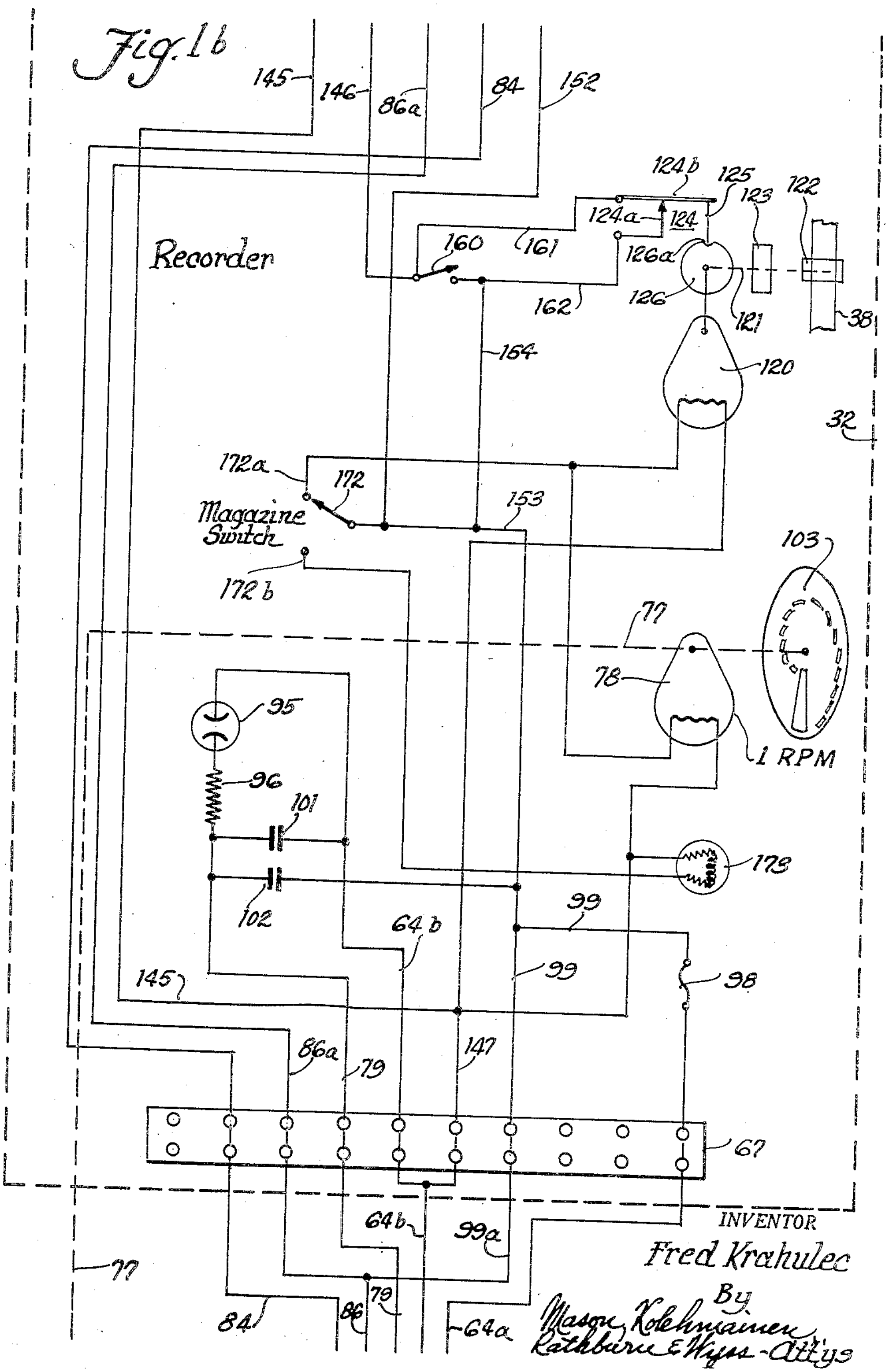
Figure 1C:
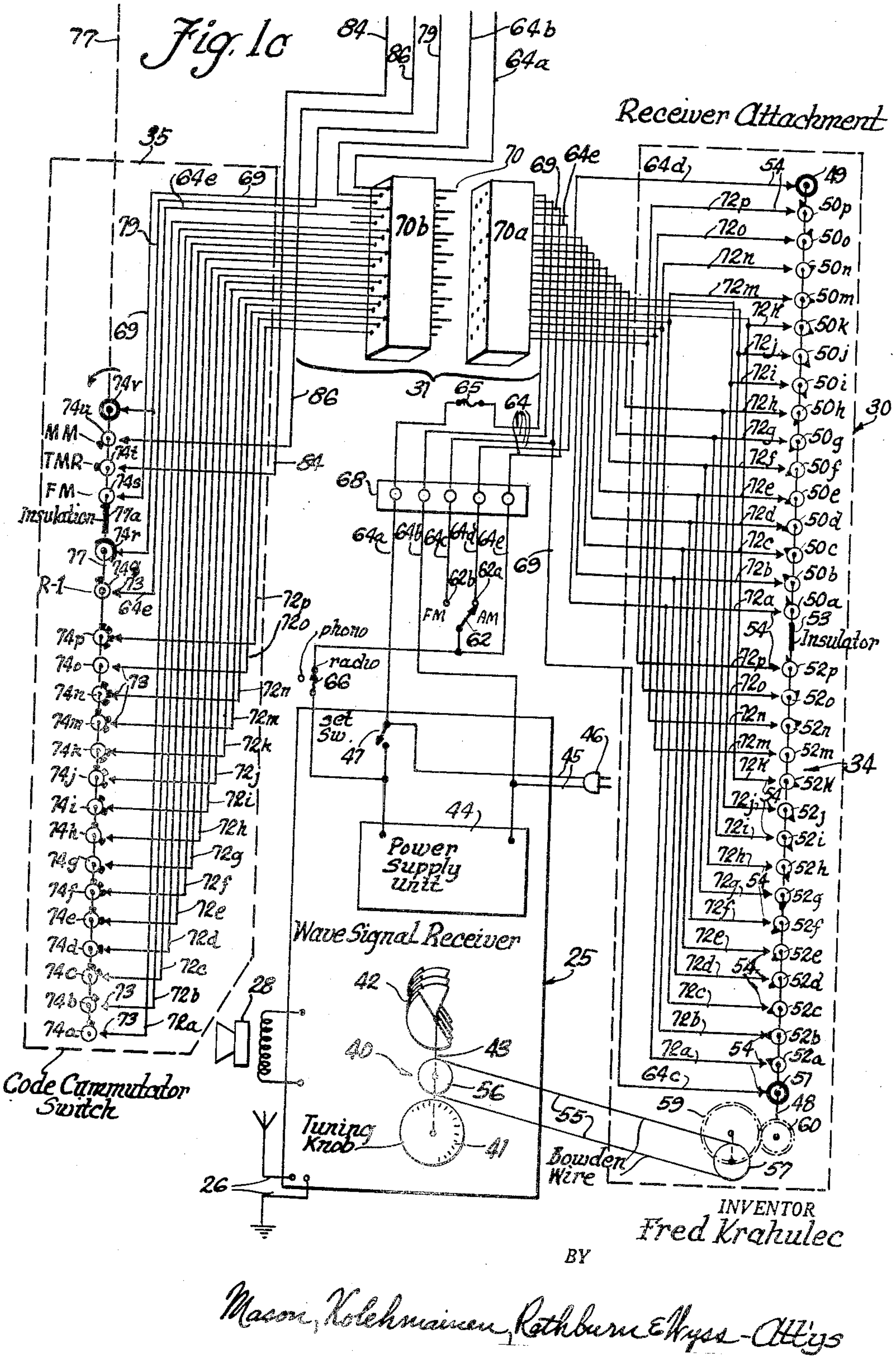

It will be understood from the following description that various features of the present invention are applicable to various systems and apparatus employed heretofore for determining the listening or viewing habits of a radio or television audience. For the purpose of fully disclosing the present invention it heas been illustrated as applied to a particular type of system in which the recording apparatus is generally disposed in a position not too far removed from the wave signal receiver being monitored. As illustrated a cable connection between the monitored receiver and the recording apparatus is provided. However, the features of the invention are applicable to systems in which the recording device is disposed remotely from the receiver. For example, the recording device may be located in a room of the collaborator's home far removed from the room where the receiver being monitored is located. The recorder might, for example, be located in the closet or basement of the home while one or more receivers to be monitored are located in various rooms of this home. The connection between the recorder and the monitored receiver may be by space link, power lines or the like. Considering first the system as a whole as schematically illustrated in Figs. 1*a*, 1*b* and 1*c* taken together, and wherein the same reference numerals are employed for corresponding parts as in the structural views of the drawings, there is illustrated schematically a wave signal receiver generally designated at 25, the tuning condition of which it is desired to monitor. In other words information is deisred as to the pass bands or channels to which the receiver 25 is tuned with respect to time and as is described hereinafter a continuous record of such tuning conditions with respect to time is made.

The receiver 25 may be any type of receiver whether it be for amplitude modulated or frequency modulated program signals, or both, or whether the signals are eventually converted to visible or audible form or both. As illustrated the wave signal receiver 25 is schematically indicated as comprising an antenna-ground circuit 26, and a signal reproducer schematically designated as a loud speaker 28. It will be understood that the signal reproducer 28 might equally well comprise a fluorescent screen or similar apparatus. Interposed between the antenna-ground circuit 26, and the signal reproducer 28 are of course the usual stages of a wave signal receiver not shown, which might comprise a tunable radio frequency amplifier, a mixer or modulator, and in the case of a conventional radio receiver, an audio frequency amplifier and the like. Since the receiver 25 is representative of any conventional wave signal receiver whether it be a radio receiver or a television receiver its mode of operation will be readily apparent to those skilled in the art and consequently no further discussion thereof is included in this application.

Figure 2:
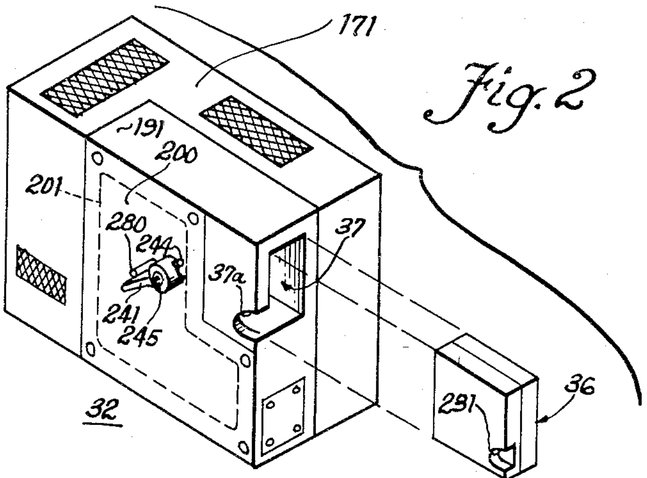
Fig. 2 is an exploded perspective view of a recording mechanism embodying the present invention.

The system and apparatus for recording the listening or viewing habits of wave signal receiver users shown in Figs. 1*a*, 1*b* and 1*c*, when combined as a unit, essentially comprises, in addition to the wave signal receiver 25 which is to be monitored, a receiver attachment generally designated at 30 suitably connected with the wave signal receiver 25, and a link generally designated at 31 connecting the receiver 25 and receiver attachment 30 with a suitable recording device generally designated at 32 and structurally disclosed in Fig. 2 of the drawings. The link 31 is illustrated as a cable connected link, but might equally well comprise some other link such as a space link, a telemeter link or the like.

The essential elements of the receiver attachment and recorder described in greater detail hereinafter comprise a position switch 34 located at the receiver attachment 30, a code commutator switch 35, located either at the recorder or the receiver attachment depending upon the type of link 31 employed, a mailable magazine 36 adapted to be disposed in a magazine receptacle 37 in the recorder 32, a record receiving element or film 38 together with means for producing record indications thereon as well as means for moving this element into the mailable magazine 36 after record indications are produced thereon, a time mark radio 39, and associated elements described in detail hereinafter.

The recorder 32, as will be described in greater detail hereinafter, includes means for recording on a suitable record receiving element 38 the tuning condition of one or more wave signal receivers such as 25 and also suitable time information whereby it is readily possible for the analysis organization to analyze the records from a selected group of wave signal receivers, representative of the listening or viewing audiences of wave signal receivers, whereby a statistical analysis may be arrived at with reference to the listening habits of wave signal receiver users. By this means the effectiveness of radio or television advertising or both may be determined with considerable accuracy.

Wave signal receivers generally include some tuning apparatus and for wave signal receiver 25 this is schematically designated at 40 in Fig. 1*c* of the drawings, comprising a tuning knob 41 and a resonant frequency varying device 42 drivingly interconnected by a tuning shaft 43. The receiver 25 also includes a power supply unit schematically designated at 44 which is adapted to be connected to a suitable power outlet by a conventional power cord 45 having at the end thereof a conventional plug connector 46. The energization of the wave signal receiver 25 is conventionally controlled by a suitable switch 47 often referred to as the set switch which generally is combined with the manual volume control means.

It will be apparent to those skilled in the art that there must be obtained from the wave signal receiver being monitored, such as 25, a response of some sort indicative of the tuning condition of the receiver. This response might be an electrical response of some sort. For example, if a superheterodyne receiver is being monitored it will be understood that the output of the local oscillator will vary in frequency with changes in tuning so as to be indicative of the pass band to which the receiver is tuned. The physical position of the resonant frequency vary means 42 or in other words the position of the tuning shaft 43 is of course also clearly indicative of the tuning condition of the receiver, and these variations in positioning of the tuning shaft 43 might be designated as a "mechanical response." Since 85 to 90% of the wave signal receivers available on the market today permit of readily obtaining a "mechanical response" indicative of the tuning condition of the receiver, the present invention has been illustrated with an arrangement for utilizing such a "mechanical response."

For the purpose of converting the tuning position of the receiver 25 to a readily transmittable indication such as an electrical signal, there is provided in the receiver attachment 30 the position switch 34, which preferably is of the form disclosed and claimed in co-pending Krahulec application Serial No. 78,921, filed March 1, 1949 (now Patent No. 2,658,963), and assigned to the same assignee as the present application. Essentially the position switch 34 comprises a rotary conducting shaft 48 to which are attached a plurality of regularly spaced contact cams 49, 50, 51 and 52. The cams 49 and 50 are designated as the AM group of cams while the cams 51 and 52 are designated as the FM cams and are electrically isolated by virtue of an insulated section 53 of the shaft 48 which separates the cams into two groups. The AM group are employed for producing signals indicative of the receiver 25 being tuned to stations in the standard broadcast band while the FM group are for frequency modulation transmitters including television transmitters. As illustrated there are fifteen cams 50 and fifteen cams 52 designated specifically as *50a, 50b, 50c, 50d, 50e, 50f, 50g, 50h, 50i, 50j, 50k, 50m, 50n, 50o, 50p, 52a, 52b, 52c, 52d, 52e, 52f, 52g, 52h, 52i, 52j, 52k, 52m, 52n, 52o*, and *52p*. As is fully disclosed in the above mentioned copending Krahulec application Serial No. 78,921, the cams 50 and 52 are each provided with a raised cam surface adapted when in a predetermined angular position to engage with their associated relatively stationary contacts generally designated at 54.

In order that the position of the shaft 48 of the rotary position switch 34 may be correlated with the position of the tuning shaft 43 of the receiver 25, there is provided a suitable mechanical link interconnecting the shafts 43 and 48, which in the main preferably comprises a pair of Bowden wires 55, the ends of which are preferably wrapped around the respective shafts 43 and 48 or around suitable pulleys such as 56 and 57 associated with these shafts. As illustrated, the pulley 56 is mounted on the shaft 43 while the pulley 57 is drivingly connected with the position switch shaft 48 through a pair of gear members 59 and 60.

The cams 50 and 52 may be angularly adjusted with respect to the shaft 48 so as to engage their associated contacts 53 in any desired predetermined sequence. Preferably the position switch 34 embodies the features disclosed and broadly claimed in Rahmel Patent 2,484,734 assigned to the same assignee as the instant application. The cams 50 are adjusted to different angular positions on the shaft 48 as illustrated, each cam engaging its associated contact 54 when the tuning shaft 43 of the receiver 25 is tuned to a particular transmitter in the standard broadcast band referred to as AM transmitters. Similarly the cams 52 are also adjusted to different angular positions so that a particular cam will engage its associated contact 54 when the receiver 25 is tuned to a particular frequency modulation or television transmitting station. As illustrated the position switch 34 may be used to convert the tuning positions of the tuning shaft 43 to control impulses for thirty different transmitters, including fifteen AM transmitters and fifteen FM and television transmitters. This is usually ample for any receiver and the channels chosen are those to which the receiver 25 is likely to be tuned. Obviously if the receiver does not receive FM signals then all thirty cams 50 and 52 may be used for indicating tuning to transmitters in the standard broadcast band. As a practical matter more than fifteen channels in the standard broadcast band are very unlikely to be required since in most cases the radio audience in any home concentrates on a relatively few transmitting stations.

It will be understood by those skilled in the art that in conventional wave signal receivers where combination frequency modulation and amplitude modulation signals are receivable, that the receiver usually comprises two separate circuits selectively rendered effective by a band switch or the like but utilizing the same tuning shaft. It therefore becomes necessary selectively to render the AM group of cams 50 or FM group of cams 52 of the position switch 34 effective in dependence upon the position of the band switch of the receiver 25. To this end a suitable switch 62 is connected to be operated to engage its AM contact *62a* or its FM contact *62b* in dependence upon the corresponding position of the band switch, not shown, of the receiver 25.

For the purpose of supplying power to the receiver attachment 30 and also through the link 31 to the recorder 32 the receiver attachment is electrically connected to the receiver 25 by a plurality of conductors, specifically five in number, designated by the reference numeral 64 and specifically as *64a, 64b, 64c, 64d*, and *64e*. The conductors *64a* and *64b* supply power from the power supply unit 44 of the receiver 25 (so long as the plug connector 46 is connected to a power source whether or not the set switch 47 is closed) to the recorder 32 through a fuse 65 and the link 31. The conductors *64a* and *64b* may be traced in Figs. *1b* and *1c* of the drawings as leading to the terminal strip 67 of the recorder 32.

In order to distinguish between phonograph operation and radio operation of the receiver 25, in the event the receiver 25 is of the so-called "console" type, a switch 66 is provided which is closed when the receiver 25 is used as a radio and open when the receiver 25 is operated as a phonograph. One end of the conductor *64e* is connected to one side of the power supply unit 44 of the receiver 25 through the switch 66 while the other end of the conductor *64e* is connected to the code commutator switch 35, through the link 31. The set switch 47 must be closed before current can flow through the conductor *64e* and consequently this conductor carries a signal indicative of the "on" or "off" condition of the receiver 25. With this connection it is possible to distinguish phonograph listening from other listening or viewing, as far as the record produced by the recorder 32 is concerned. The contacts *62a* and *62b* of the switch 62 which is connected to the power supply unit 44 through the switch 66, are respectively connected through the conductors *64d* and *64c* to the contacts 54 associated with the cams 49 and 51 respectively thereby rendering the AM section or the FM section of the position switch 34 effective in dependence upon the position of the switch 62 and consequently the position of the band switch, not shown, of the receiver 25. The cams 49 and 51 make continuous contact with their associated contacts 54 regardless of the position of the shaft 48. The conductor *64c* which is effectively the FM conductor is also connected to the code commutator switch 35 through the link 31 by means of a conductor 69, whereby an impulse is produced for record purposes when the receiver 25 is tuned for FM or television reception to distinguish this tuning from tuning to transmitters in the standard broadcast band.

In order to simplify the installation the link 31 comprises two sections, one associated with the receiver attachment 30 and the other with the recorder 32 or the code commutator switch 35. These sections are interconnected by a two-part multi-conductor plug connector generally designated at 70, comprising a female portion *70a* and a male portion *70b*. This type of connector is often referred to as a "Jones plug" and as illustrated is adapted to accommodate twenty-one conductors although in the illustrated embodiment only 19 conductors are used. Fifteen of these nineteen conductors connected to corresponding contacts on both parts of the connector 70 are designated as 72a, 72b, 72c, 72d, 72e, 72f, 72g, 72h, 72i, 72j, 72k, 72m, 72n, 72o, and 72p. These conductors effectively interconnect through the connector 70 contacts 54 associated with the cams 50 and 52 with similar contacts 73 of the code commutator switch 35, the individual conductors 72 being connected to the particular contacts 54 associated with the particular cams 50 and 52 having identical subscripts with the subscripts of the conductors 72. In other words, the conductor 72a is connected to the cam means 50a and 52a through the associated contacts 54, the conductor 72b is connected to the cam means 50b and 52b through the associated contacts 54, etc. The remaining four conductors connected to four other contacts of the plug connector 70 are the conductors 64a, 64b, 64e, and 69 discussed above.

With the above described arrangement the receiver attachment 30 which is a very small and compact device may readily be associated with the wave signal receiver 25. When initially installing the device the mechanical Bowden wire connection described above must be made and the switches 62 and 66 must be attached to the band switch and phonograph switch respectively of the receiver 25. Preferably the electrical connections embodying the conductors 64 are made to a terminal strip 68 at the receiver attachment and the connections to the receiver 25 from this terminal strip 68 must be made. In the great majority of the receivers disposed in homes throughout the United States, the receiver attachment can be disposed within available cabinet space of the receiver or attached to the back thereof.

Figure 4:
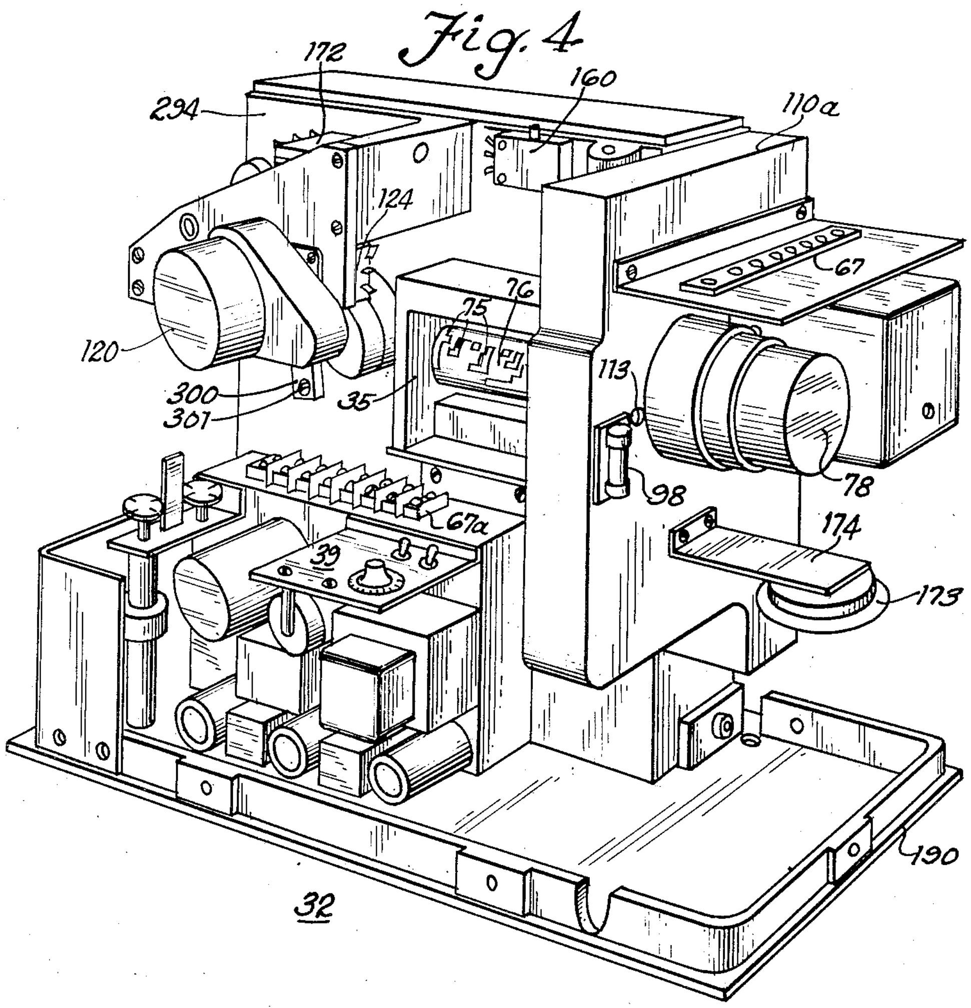
Fig. 4 is a view similar to Fig. 3 showing the other side of the recording mechanism with the cover removed.

After the receiver attachment 30 is properly associated with the receiver 25 as shown in Fig. 1c of the drawings, to complete the installation it is then merely necessary to connect the recorder unit 32 to be described in detail hereinafter with which the plug portion 70b of the plug connector 70 is associated to the female connector portion 70a. The cable connected to the plug portion 70b is of such length as to permit disposition of the recorder 32 in any desired position. When such a cable is employed it is generally desirable to locate the recorder 32 adjacent the receiver, as for example, within an end table or a suitable cabinet disposed near the receiver 25. The reason for this is obvious since it is generally undesirable to have a substantial length of cable extending between the receiver attachment and the recorder and as a rule the collaborator would object. Where remote positioning of the receiver attachment 30 and the recorder 32 is desirable the cable interconnecting the two and designated as the link 31 in Fig. 1c of the drawings is dispensed with and another type of link such as a space link or a link employing the power lines as a carrier for the signals may be substituted. Also in the latter case the code commutator switch 35 normally associated with the recorder 32 as is best shown in Fig. 4 of the drawings is associated with the receiver attachment thereby dispensing with the large number of conductors between the recorder and the position switch which are necessary to interrelate the position switch 34 and the code commutator switch 35.

For the purpose of converting the electrical response of the position switch 34 indicative of the position of the tuning shaft 43 to a readily recordable and decodable response the cod commutator switch 35 referred to above is provided. This code commutator switch 35 is schematically indicated in Fig. 1c of the drawings and is preferably a specific one of the rotary switches disclosed in the above mentioned Krahulec application, Serial No. 78,921, consisting of a group of wiper springs which comprise the contacts 73 referred to above arranged to make contact with raised portions 75 comprising a code pattern engraved on a conducting drum 76 best shown in Fig. 4 of the drawings. The angular position of the drum 76 determines the particular code produced by the code commutator switch 35. The code commutator switch might equally well comprise a plurality of individual cams corresponding to the raised portions 75 associated with each of the wiper contacts 73, and this arrangement is illustrated in Fig. 1c of the drawings since it lends itself better to schematic illustration. As illustrated in Fig. 1c this code commutator switch comprises a plurality of cams 74a, 74b, 74c, 74d, 74e, 74f, 74g, 74h, 74i, 74j, 74k, 74m, 74n, 74o, 74p, 74q, 74r, 74s, 74t, 74u, and 74v which have raised contact portions equivalent to the portions 75 engraved on the drum 76. These cams are illustrated as being mounted on a shaft 77 having an insulated section 77a so as electrically to isolate the cams 74s, 74t, 74u and 74v from the remaining cams 74. As illustrated the shaft 77 is adapted to be rotated preferably at one revolution per minute by a suitable synchronous motor and gear train unit 78 best shown in Figs. 1b and 4 of the drawings. As illustrated in Fig. 4 the synchronous motor 78 forms a part of the recorder unit 32 and is drivingly connected to the code commutator switch 35. Where the cable connected arrangement cannot be employed and the code commutator switch 35 is associated with the receiver attachment 30 a synchronous driving motor such as 78 must be disposed at the receiver attachment. It will be apparent that the drum 75 and consequently the cams 74 are capable of assuming a large number of angular positions and in a particular embodiment which has been successfully built and tested twenty-six angular positions of the code commutator switch 35 may be employed for producing coding pulses.

In order to record readily decodable record indications of the channels to which a plurality of receivers such as 25 may be tuned, across a single record receiving element 38 which, for example, might comprise a sixteen millimeter film, it was decided to employ a "binary code" which was found to be especially satisfactory and lends itself to high speed decoding. By employing such a binary code only four angular positions of the code commutator switch need be used to code fifteen separate tuning channels. To this end the cams 74a, 74b, 74c, 74d, 74e, 74f, 74g, 74h, 74i, 74j, 74k, 74m, 74n, 74o and 74p are provided with various combinations of raised contact portions all confined within four angular positions of the shaft 77. Cam 74a is provided with a single raised contact portion in a first of these four positions; cam 74b is provided with a single raised contact portion in a second of these angular positions; cam 74c is provided with two raised contact portions, one in the first angular position and one in the second angular position; etc. As illustrated in the drawings the combination of raised contact portions in only four angular cam positions to produce fifteen different code combinations is tabulated in the following table:

| Station No. | Cam | Raised Contact Portion in the Following Position or Positions |
|---|---|---|
| | | *Position* |
| 1 | 74a | 1 |
| 2 | 74b | 2 |
| 3 | 74c | 1—2 |
| 4 | 74d | 3 |
| 5 | 74e | 1—3 |
| 6 | 74f | 2—3 |
| 7 | 74g | 1—2—3 |
| 8 | 74h | 4 |
| 9 | 74i | 1—4 |
| 10 | 74j | 2—4 |
| 11 | 74k | 1—2—4 |
| 12 | 74m | 3—4 |
| 13 | 74n | 1—3—4 |
| 14 | 74o | 2—3—4 |
| 15 | 74p | 1—2—3—4 |

Figures 18, 19, 20, 21:
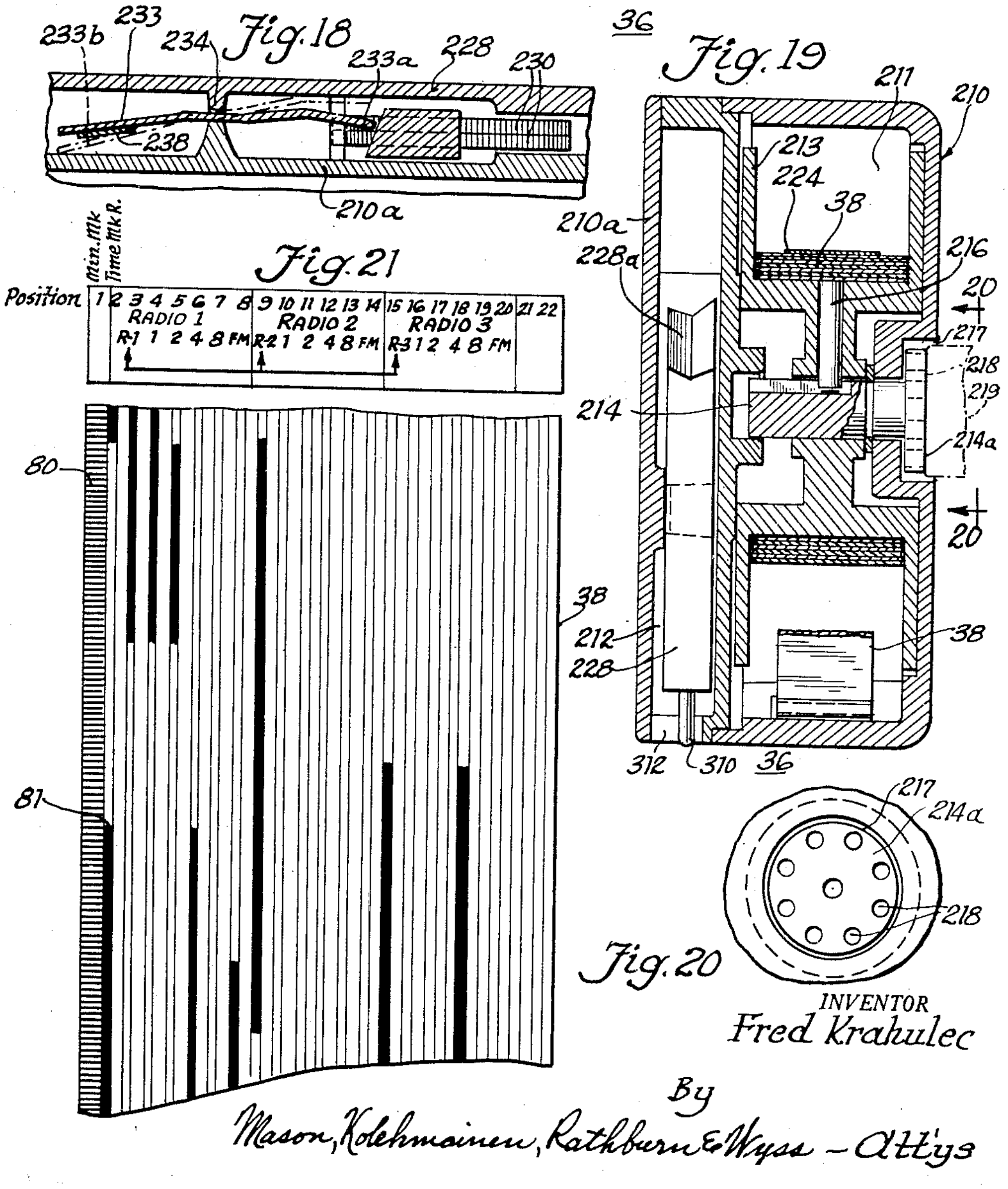
Fig. 18 is a sectional view taken on line 18—18 of Fig. 14.
Fig. 19 is a sectional view taken on line 19—19 of Fig. 15, assuming
Fig. 20 is a fragmentary view taken along line 20—20 of Fig. 19.
Fig. 21 is an enlarged fragmentary view of a record strip employed in the recorder illustrated in Figs. 2 to 4 of the drawings with representative record indications shown thereon to aid in understanding the present invention.

The binary code type of basic record which requires only four positions across a record receiving element to record fifteen separate tuning channels can best be understood by reference to Fig. 21 of the drawings where the record receiving element 38 is indicated as comprising twenty-two transverse positions in which record indications may be produced. Four positions on this element 38 for coding fifteen channels comprise the positions 4, 5, 6 and 7. The first of these, namely position 4, is assigned a code of one, the second, namely position 5, is assigned a code of two, the third, namely position 6, is assigned a code of four, and the fourth, namely position 7, is assigned a code of eight. The presence or absence of code marks in these four positions will permit of fifteen different combinations with each combination equal to the sum of the code numbers with which code marks are associated. The number of the station to which the receiver 25 is tuned is determined by the sum of code numbers associated with the respective positions on the element 38 in which code marks are produced. If code marks appear in a line across the element 38 only in positions 4 and 7 assigned code numbers one and eight, the station to which the receiver 25 is tuned is station number nine. For fifteen stations this may be tabulated as follows:

| Station Number to Which Receiver 25 Is Tuned | Code Number or Numbers of Positions on Element 38 in Which a Code Mark Appears |
|---|---|
| 1 | 1 |
| 2 | 2 |
| 3 | 1 and 2 |
| 4 | 4 |
| 5 | 1 and 4 |
| 6 | 2 and 4 |
| 7 | 1, 2 and 4 |
| 8 | 8 |
| 9 | 1 and 8 |
| 10 | 2 and 8 |
| 11 | 1, 2 and 8 |
| 12 | 4 and 8 |
| 13 | 1, 4 and 8 |
| 14 | 2, 4 and 8 |
| 15 | 1, 2, 4 and 8 |

Thus by using four positions on the recording element 38, fifteen separate channels can be recorded for any particular receiver and an additional channel can be employed to indicate whether or not the receiver is turned on or not so as to afford information as to whether the receiver is tuned to stations other than the fifteen channels for which record indications are available. It is understood that if the recorded information indicates that the receiver is tuned for a substantial portion of time to stations other than the fifteen channels provided that some of these other stations should be included in the fifteen channels. Otherwise a significant amount of listening or viewing is not recorded.

The resilient contacts 73 associated with the cams 74*a*, 74*b*, 74*c*, 74*d*, 74*e*, 74*f*, 74*g*, 74*h*, 74*i*, 74*j*, 74*k*, 74*m*, 74*n*, 74*o*, and 74*p* are connected to conductors 72*a* 72*b*, 72*c*, 72*d*, 72*e*, 72*f*, 72*g*, 72*h*, 72*i*, 72*j*, 72*k*, 72*m*, 72*n*, 72*o* and 72*p* respectively whereby a particular position of the position switch 34 will render a corresponding particular coding cam effective.

The cam 74*r* is a wiper cam so as to complete the electrical circuit to a suitable control device associated with the recorder 32 when any one of the cams 74*a*, 74*b*, 74*c*, 74*d*, 74*e*, 74*f*, 74*g*, 74*h*, 74*i*, 74*j*, 74*k*, 74*m*, 74*n*, 74*o*, and 74*p* produces a pulse or group of pulses by virtue of one of the associated cams 50 or 52 being in a predetermined position. The cam 74*v* is also a wiper cam connected in parallel with the cam 74*r* to render the section of the coding switch 35 above the insulator 77*a* effective. These cams 74 are connected by means of a conductor 79 to the terminal strip 67 on the recorder 32.

Since it is desirable to know which wave signal receiver produces a particular record on the recording element 38 when the tuning conditions of a plurality of receivers is recorded on a single element 38 as indicated in Fig. 21 of the drawings, the cam 74*q* having a single contact portion in an angular position of the shaft 77 just ahead of the first of the four angular positions referred to above for the direction of rotation of the shaft 77 indicated by the arrow in Fig. 1*c* of the drawings is provided, so as to produce a code pulse once per minute indicating that a particular receiver is turned on. This code pulse for receiver 25 with cam 74*q* as indicated would appear in the record position 3 in Fig. 21 of the drawings designated R–1. If the tuning conditions of additional radios such as Radio 2 and Radio 3 were also recorded on element 38, then each of these receivers would have a code commutator switch in which the cams 74*q* would produce code marks in positions nine and fifteen of the element 38. The contact 73 associated with the cam 74*q* is connected to the conductor 64*e* mentioned above. If no code mark is produced on the element 38 by electrical contact of cam 74*q* with its associated contact 73, then wave signal receiver 25 is either turned off or used as a phonograph which latter condition by virtue of switch 66 is recorded just as if the receiver were turned off. If no code mark appeared in any of the four coding positions for Radio 1 (assumed to be receiver 25) referred to above and yet a code mark appeared in each cycle in position three designated as R–1, then this would be an indication that the receiver 25 was tuned to a station other than the fifteen provided for with the position switch 34, generally referred to as "all others" listening. If the record indicates such "all others" listening for substantial periods of time, then it is apparent that either additional cams should be provided on the position switch 34 and code commutator switch 35 or the existing cams modified to accommodate some other transmitting stations which are listened to frequently.

The cam 74*s* is designated as the frequency modulation cam and is provided in order to produce an indication on the record receiving element that frequency modulation listening is involved whereby the code pattern will be representative of one of the stations listened to in the frequency modulation and television group rather than in the standard broadcast group. This cam is on the section of shaft 77 electrically isolated from the cams 74*a* to 74*r*. The contact 73 associated with the cam 74*s* is connected by the conductors 69 and 64*c* directly to the wiper contact cam 51 of the position switch 34 which is in the frequency modulation group of cams. The cam 74*s* is indicated as having a raised contact portion in a position immediately following the position of the last of the four angular code positions utilized in the coding cams 74*a* to 74*p* for the indicated direction of rotation of the shaft 77 so as to produce a record indication in the eighth position on element 38 in Fig. 21 designated as FM.

As will become apparent from the following description the motor 78 is continuously energized whether or not the wave signal receiver 25 is in use and consequently the code commutator switch 35 is rotated at one revolution per minute at all times. In addition to providing the code information indicative of the station to which the receiver 25 is tuned, whether it be a frequency modulation or an amplitude modulation station, certain other information is necessary and desirable on the record receiving element 38 particularly where the mailable magazine 36 is employed in order that a complete and accurate analysis of the listening habits of the wave signal receiver users may be arrived at from the recorded information. Generally the record receiving element 38 is moved in some predetermined manner with respect to time such for example as at constant speed. Under this condition the tuning condition of the receiver 25 will be recorded as a function of time. However, if the recording element is eventually disposed in a mailable magazine which is periodically replaced it is essential that some additional time information be automatically applied which will permit the analysis organization to orientate the recording element with respect to time in any predetermined calendar period. As has been pointed out in the above mentioned Rahmel application, Serial No. 762,962, a very satisfactory means of accomplishing this comprises the employment of the time mark radio 39 associated with the recorder 32, which time mark radio permits a recording of the "sign off" or "sign on" time or both of a particular transmitting station (preferably a clear channel station) located in the same general area as the collaborator's home. Since the "sign off" and "sign on" times vary slightly from day to day and usually very substantially on week ends, a unique time pattern is produced whereby it is readily possible to orientate the record receiving element 38 into any predetermined calendar period.

In addition to recording such time information it is also desirable to provide accurate time information minute by minute for use as a reference in decoding the recorded information. Consequently the cams **74*t* and 74*u* are provided which are respectively designated as the time mark radio cam, TMR, and the minute mark cam, MM. The minute mark cam 74*u* causes the production of the marks 80 in the first position on the record receiving element 38 shown in Fig. 21 of the drawings, while the time mark radio cam 74*t* causes the production of a record indication in the second position on element 38 shown in Fig. 21. The raised portion of cams 74*u* and 74*t* are so disposed angularly as to be rendered effective to produce successive code pulses ahead of any of the other cams 74 during the coding cycles which are of one minute duration and continuously reoccur. A record is continuously produced whenever the time mark radio 39 receives carrier from the transmitter to which it is tuned and the critical time information designated at 81 in Fig. 21 of the drawings is the "sign on" time when the particular transmitter to which the time mark radio is tuned comes back on the air. The contact 73 associated with the cam 74*t* is connected by means of a conductor 84 with the time mark radio 39 through the terminal strip 67 on the recorder 32. Similarly, the contact 73 associated with the cam 74*u* is connected by means of a conductor 86 to the terminal strip 67 on the recorder 32, and since the contact portion of the contact 74*u* engages with its contact 73 once per minute a record is produced on the element 38** once per minute by virtue of such operation.

It will be understood that the pulses produced by the coding switch 35 may be applied to control any suitable element capable of producing a record on the movable record receiving element 38. This record receiving element might be a coated tape of some sort upon which a record may be produced by means of a suitable printer bar actuated in dependence upon the pulses to produce the desired code on the tape. It will be understood that the record receiving element might also comprise magnetic wire or tape, facsimile paper, punched tape, photographic film and the like. The specific embodiment is illustrated as employing a record receiving element 38 in the form of photographic film, preferably 16 mm. film. It is believed that using photographic film is preferable to using coated paper tape, for example, with respect to automatic reading capability for at least two reasons: first, because of the greater change in light transmission of exposed film compared to the corresponding change for coated tape; and second, film lends itself more readily to edge guiding than does paper tape. By employing film it will be understood that to obtain a readable record thereon the film must first be developed in a conventional manner.

Figure 3:
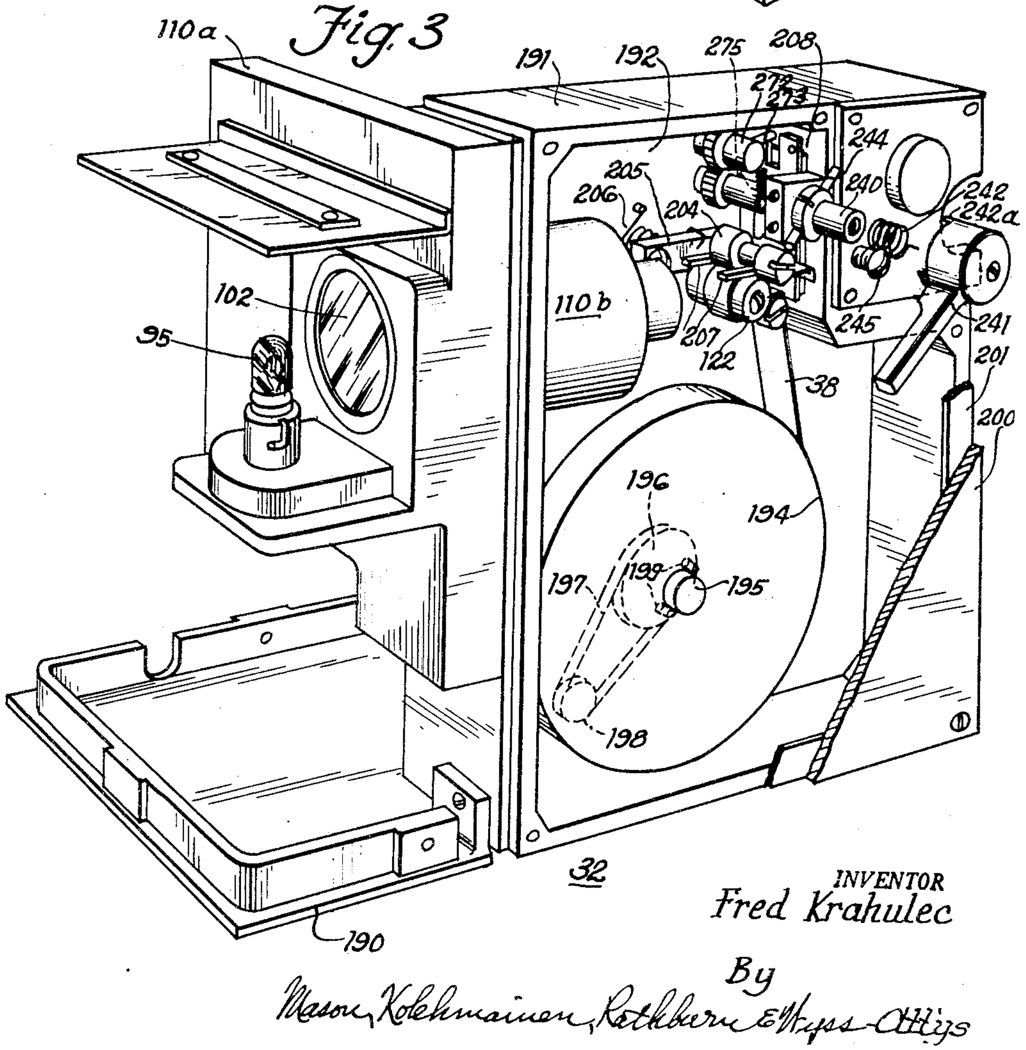
Fig. 3 is an enlarged perspective view of one side of the recording mechanism of Fig. 2 with parts of a cover removed.
Figures 5, 6:
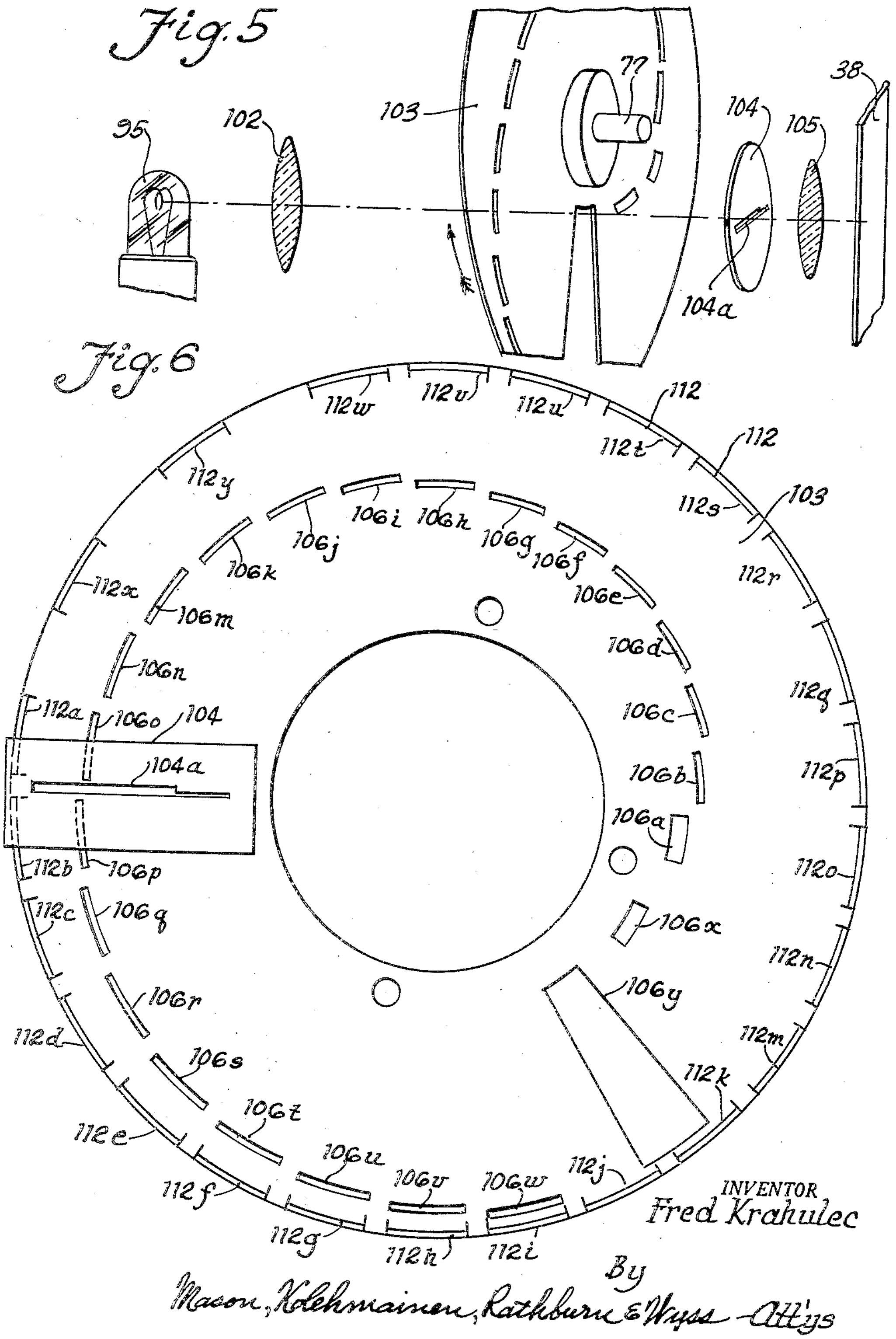
Fig. 5 is an enlarged somewhat schematic diagram of the optical system of the recorder of Figs. 2 to 4.
Fig. 6 is an enlarged view of two elements of the optical system shown in Fig. 5 viewed from the side opposite the one adjacent in which the record receiving element is disposed.

In order to produce a record indication on the film or record receiving element 38 in accordance with the code pattern in the various positions as indicated in Fig. 21 of the drawings the pulses produced by the continuous rotation of the coding switch 35 at one revolution per minute are preferably employed to energize a suitable lamp generally designated at 95 in Figs. 1*b* and 3 of the drawings thereby to expose the film. For the purpose of insuring long operating life the lamp 95 is preferably an argon lamp or the like connected in series with a current limiting resistor 96 although in Fig. 5 it is schematically designated as a filament type lamp. As illustrated, the argon lamp 95 is connected to the terminal strip 67 across the conductors **64*b* and 79. The electrical circuit for energizing the lamp 95 may readily be traced through the receiver attachment 30 and the code commutator switch 35. For example, assume that the wave signal receiver 25 is turned on (set switch 47 is closed) and the tuning shaft 43 is tuned to a position such that the receiver is receiving station No. 4 in the standard broadcast band whereby the position switch cam 50*d* is in electrical engagement with its contact 54** as shown in Fig. 1*c* of the drawings. Since the wave signal receiver 25 is being operated as a radio in the amplitude modulation or standard broadcast band, the switch 66 is moved to the radio position and the switch 62 is in engagement with its AM contact **62*a*. Under these conditions current from the source flows through the plug connector 46 and the power cord 45 from one terminal of the source through the conductor 64*b* directly to one electrode of the argon lamp 95, then through the current limiting resistor 96, the conductor 79, the contact 73 associated with the cam 74*r*, the shaft 77 below the insulator 77*a*, the cam 74*d* and the contact 73 associated therewith, the conductor 72*d*, the contact 54 associated with the cam 50*d*, the cam 50*d* of the position switch 34, the shaft 48 above the insulator 53, the cam 49 and associated contact 54, conductor 64*d*, switches 62 and 66 and to the other side of the power source through the set switch 47. Whenever the high point on the cam 74*d* engages its associated contact 73 the argon lamp 95 will be energized and this will occur cyclically once per minute as long as the tuning of wave signal receiver 25 remains unchanged. The argon lamp 95 will also be energized whenever the high point of the cam 74*q* engages its stationary contact 73, in view of the circuit in parallel to the one just traced between the shaft 77 and the switch 66 comprising the cam 74*q* and its associated conductor 73 and conductor 64*e*. As long as the wave signal receiver 25 is turned on with the set switch 47 closed and the switch 66 closed a pulse will be produced once per minute energizing the argon lamp 95 to indicate that the wave signal receiver 25 is turned on. If the wave signal receiver 25 were tuned to an FM channel another circuit would be completed to energize the lamp 95 whenever the cam 74*s* engaged its associated contact 73**.

Since it is desirable for the argon lamp 95 to be energized for the purpose of causing the time mark radio information and minute marks to be produced on the record receiving element 38, whether or not the wave signal receiver 25 is turned on it is necessary to provide a circuit for the lamp 95 through the cams **74*t* and 74*u* independent of the set switch 47. The circuit for producing the minute marks is completed through the conductor 64*a* which includes the fuse 65, the terminal strip 67 at the recorder 32, the fuse 98, a conductor 99, back to the terminal strip 67, a conductor 99*a*, the conductor 86 to the minute mark cam 74*u*, the shaft 77 above the insulator 77*a*, the cam 74*v*, the conductor 79, resistor 96, argon lamp 95, and the conductor 64*b* back to the other side of the power source. Thus it is apparent that regardless of the condition of the wave signal receiver 25, the argon lamp 95 will be energized once per minute at the instant the cam 74*u* engages its associated contact 73. The circuit for energizing the lamp 95 to record information from the time mark radio whenever the cam 74*t* engages its associated contact 73 and the contacts 100*a* of a relay 100** to be described hereinafter, are closed as shown in Fig. 1*a* of the drawings, may be traced from one side of the power source connected to the plug connector 46 through the conductor 64*a* including the fuse 65, the terminal strip 67, the fuse 98, the conductor 99, the conductor 99*a*, the conductor 86*a* to contacts 100*a* of the relay 100, the conductor 84, the cam 74*t*, the shaft 77 above the insulator 77*a*, the cam 74*v*, the conductor 79, resistor 96, argon lamp 95, and the conductor 64*b* to the other side of the power source connected to plug connector 46.

From the above discussion it will be apparent that the argon lamp 95 is switched on and off several times each minute by virtue of the operation of the code commutator switch 35. In order to prevent any radio interference by virtue of this periodic switching operation a suitable noise suppressor circuit is preferably provided in the form of capacitors 101 and 102 shown in Fig. 1*b* of the drawings, the former connected across the serially arranged lamp 95 and resistor 96, and the latter connected across the various contacts of the code commutator switch 35 in a manner well understood by those skilled in the art.

For the purpose of causing the argon lamp 95 to expose portions of the film 38 in a desired predetermined manner so the code indications are produced in the correct positions across the record receiving element 38 as shown in Fig. 21 of the drawings, it is necessary to expose predetermined transverse portions of the film 38 in synchronism with the energization of the light source 95. In accordance with the present invention there is provided in the recorder 32 a suitable optical system best shown in Figs. 5 to 8 of the drawings. This optical system extends between the argon light source 95 and the film or record receiving element 38 to expose desired restricted areas of the film to the light source 95. This optical system starting with the portion adjacent the lamp 95 comprises a condensing lens 102, a rotating shutter disk 103, a fixed slit member or target 104, and a projection lens 105. Light from the argon lamp 95 passes through the condensing lens 102, then through a predetermined one of a plurality of openings defined in the rotating shutter disk 103, then through a horizontally disposed slit 104*a* in the target 104 and finally through the projection lens 105 to the record receiving element or film 38.

Figure 7:
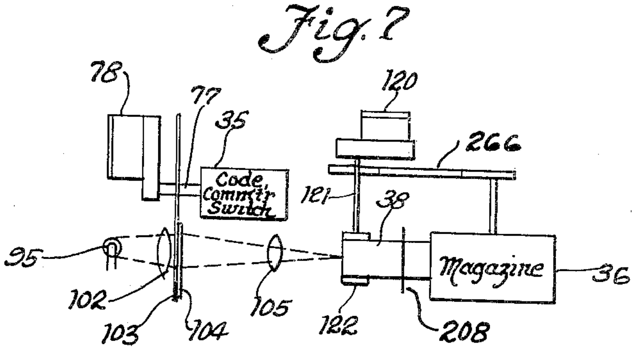
Figs. 7 and 8 are respectively schematic top and side view diagrams indicating the relationship particularly of the optical system of Fig. 5 as embodied in the recorder of Figs. 2 to 4 with respect to additional parts of the recorder for producing a suitable record.

For the purpose of properly correlating the code commutator switch and the rotating shutter disk 103, the latter is also rotated at one revolution per minute by the motor 78 as is clearly shown in Figs. 1*b* and 7 of the drawings where the shaft 77 drives both the cams 74 and the shutter disk 103. In the event that the code commutator switch is associated with the receiver attachment 30 rather than the recorder 32 two identical synchronous motors 78 would be employed, one for driving the shutter disk 103 and one for driving the code commutator switch 35 in synchronism therewith. The slit 104*a* in the target 104 defines the limits of the film area which can be exposed by the light source 95 for a particular position of the film 38 and all positions of the shutter disk 103.

In order to cause light from the source 95 to fall on the correct positions transversely of the film 38 in dependence upon the pulses produced by the code commutator switch 35, the rotating shutter disk 103 is provided with a plurality of elongated openings or slits, twenty-two being specifically shown to correspond with the twenty-two positions indicated on the record receiving element 38 in Fig. 21 of the drawings, designated as 106*a*, 106*b*, 106*c*, 106*d*, 106*e*, 106*f*, 106*g*, 106*h*, 106*i*, 106*j*, 106*k*, 106*m*, 106*n*, 106*o*, 106*p*, 106*q*, 106*r*, 106*s*, 106*t*, 106*u*, 106*v* and 106*w*. These slits are arranged in a spiral around the disk to cause the light to successively move across the film 38 from left to right as viewed in Fig. 21 with clockwise rotation of the disk 103 as viewed in Figs. 5 and 6 and assuming the light source 95 is continuously energized. This shutter disk 103 rotates at one revolution per minute and successively presents the slits 106*a*, 106*b*, 106*c*, etc., in that order along a plane extending between the light source 95 and the film 38 through the slit 104*a* in the target 104. The film 38 preferably moves the width of the image of the slit 104*a* during the time that the rotating shutter disk 103 makes one revolution. Consequently the film is scanned transversely by the spirally arranged slits 106 in the shutter disk 103 and longitudinally by movement of the film 38 through a distance at least the width of the slit 104*a* during this time. It will be apparent that the engagement of the particular contacts of the code commutator switch must be correlated with a corresponding slit 106 in the rotating shutter disk 103 to give the desired record.

Referring now to Fig. 21 of the drawings, it will be apparent that a single radio without any FM band requires seven positions on the film or tape which means that only seven of the slits 106 are required. The slit 106*a* is employed to produce the minute mark on the film and this slit must be in line with the slit 104*a* in the target 104 for the instant of time that the cam 74*u* of the code commutator switch 35 engages its associated contact 73. The slit 106*b* is employed for the time mark radio indication and this slit must be in line with the slit 104*a* in the target 104 during the time that the cam 74*t* of the code commutator switch 35 engages its associated contact 73. The next four slits 106*c*, 106*d*, 106*e*, and 106*f* are employed for recording in the four code positions on film 38 the stations to which Radio 1 (receiver 25) is tuned. These slits must be successively effective for light transmission during each cycle as the cams 74*a* to 74*p* assume their four effective angular positions discussed above. In the event that the wave signal receiver 25 being monitored is tunable to frequency modulation channels including television channels the slit 106*g* of the rotatable shutter disk 103 is employed and this slit 106*g* must be in registry with the slit 104*a* of the target 104 when the FM cam 74*s* engages its contact 73. The remaining slits in the rotating shutter disk 104 are employed to expose the additional positions 9 to 22 on the record receiving element 38 shown in Fig. 21 which would be used only if the tuning condition of additional receivers were to be recorded on the single film 38.

The rotating shutter disk 103 is mounted in a vertically disposed housing section 110*a* in the recorder 32 as best shown in Figs. 3 and 4 and is directly driven from the synchronous motor 78 which is mounted on one side of housing section 110*a*. The structural arrangement of the optical system schematically shown in 5 and 7 of the drawings is readily apparent from Fig. 3 of the drawings where the light source 95, the condensing lens 102 and the film 38 are visible. The shutter disk 103 is rotated in the housing section 110*a* and the target 104 and projection lens 105 are disposed in the housing section 110*b*. Actually the housing sections 110*a* and 110*b* define a housing for the optical system and effectively protect the same.

In order to be sure that the proper slit 106 is rendered effective simultaneously with the code switch 35 assuming a proper position, it is necessary to be able to see at least a portion of the disk 103 and for this reason the housing 110*a* is provided with a peep hole 113 shown in Fig. 4 of the drawings through which circumferential markings 112 disposed along the circumference of the rotating shutter disk 103 are visible. These markings 112 are displaced 180 degrees from the associated slits 106 so that when a slit 106 is effectively in registry with the slit 104*a* of the target 104 a corresponding marking 112 is visible through the peep hole 113. The markings 112 are designated by the same subscript as the corresponding slits 106. The ends of each edge marking 112 are clearly delineated to indicate the position of the corresponding ends of the corresponding slits 106.

Actually these markings 112 are uniformly spaced in the same manner as the uniformly spaced slits 106, except for the slits 106*a*, 106*x* and 106*y* which are non-uniformly spaced. The slit 106*x* is provided in the event that it is desired to put some additional time information in a portion of position one on film 38 and the slit 106y effectively is a large opening extending across the shutter disk 103 for the purpose of examining the entire field across the film 38 during the initial adjustment of the optical system. This large opening 106y might also be employed, if desired, for the purpose of indicating power outages. For example, the system might be arranged so that in the event of a power outage the light source 95 might be maintained energized for a period such as two minutes after power is restored whereupon an appropriate record would be produced on the film clearly indicating that such power outage has occurred.

In initially adjusting the optical system with the code commutator switch 35 the field man would see that the particular cam 74 of the coding switch 35 causes the light source 95 to be energized within the period that the ends of the reference marks 112 representative of the corresponding slit 106 are visible through the peep hole 113. For example, the energization of the light source 95 by engagement of the minute mark cam 74*u* with its associated contact 73 must occur while the reference or calibration mark 112*a* is visible through the peep hole 113. If this is not the case an adjustment must be made to insure that light from the source 95 is on when the minute mark slit 106*a* is effective to expose the film 38. This relationship must also be true for the remaining slits 106 and associated cams 74 which can be determined by the reference marks 112 as viewed through the peep hole 113.

Figure 11:
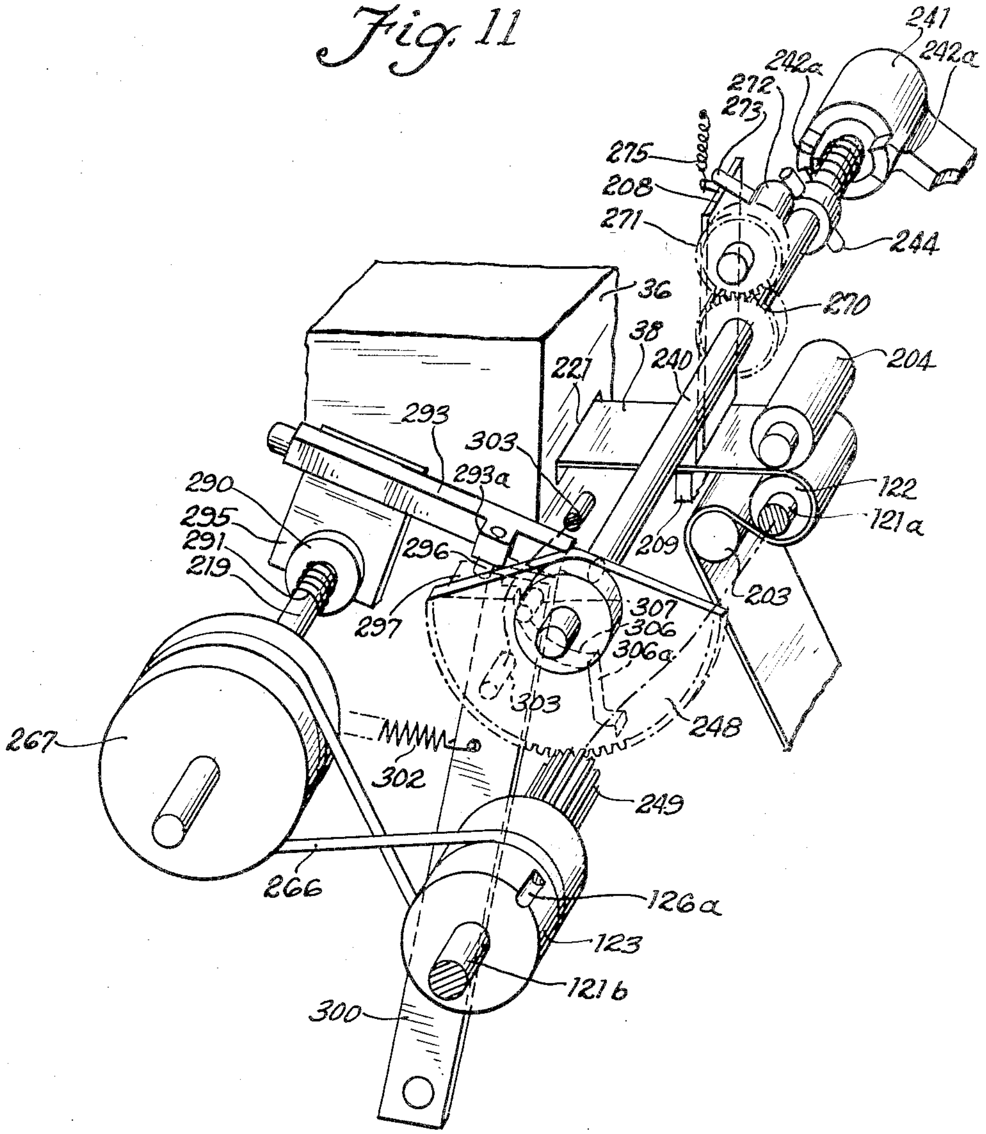
Fig. 11 is an enlarged perspective view of the magazine release mechanism and associated parts.

To move the record receiving element 38 in some predetermined manner with respect to time, the recorder 32, as illustrated in the schematic diagram disclosed by the combination of Figs. 1*a*, 1*b* and 1*c*, includes a film drive motor 120 which is drivingly connected by a shaft 121 to a friction drive roller 122 preferably to rotate the latter at ½ revolution per hour thereby to move the film 38 at least the width of the target slit 104*a* described above, during one revolution of the shutter disk 103. For purposes which will become apparent from the following description the motor 120 drives the friction drive roller 122 through a double over running clutch schematically indicated at 123. Actually as is best shown in Fig. 11 of the drawings the shaft 121 comprises parts 121*a* and 121*b*, one disposed on either side of the member 123. With this arrangement the film drive roller 122 may be rotated at a higher speed than the speed of the associated motor shaft portion 121*a*. Preferably also the film drive motor 120 operates a cam switch 124 comprising relatively movable contacts 124*a* and 124*b* operated by a cam follower 125 associated with the cam 126 rotatable at one half revolution per hour. The cam 126 has a short dwell portion or recess 126*a* so as to close the switch 124 (closed position indicated) for a few minutes such as two to three minutes during each two hour interval. During the remainder of the two hour interval the switch 124 is open. The switch 124 is employed to render the time mark radio 39 effective for a few minutes during every two-hour period, the purpose of which will become apparent from the description included hereinafter.

The time mark radio 39 forms no part of the present invention and is fully described in the co-pending Rahmel application Serial No. 762,962 referred to above. This time mark radio 39 is a fixed tuned receiver tuned to a particular transmitting station (preferably a clear channel station) located in the same area as the collaborator's home. As illustrated schematically in Fig. 1*a* of the drawings this fixed tuned receiver or time mark radio 39 comprises an antenna ground circuit 130, a fixed tuned radio frequency amplifier 131, an oscillator modulator unit 132, an intermediate frequency amplifier unit 133, and a detector 134 all connected in tandem in the order named. Whenever the receiver 39 is turned on and the particular transmitting station to which it is always tuned is "on the air" a carrier signal is received by the receiver 39. The carrier portion of this signal is rectified by the detector 134 and appears across a resistor 135 as a direct current voltage. This voltage is applied as a negative bias to the grid of the suitable control tube 136. The plate circuit of the control tube 136 is connected from a source of +B potential 137 through the winding of the relay 100 to ground 138 through suitable grounding resistors 139 and 140.

The fixed tuned receiver 39 is illustrated as having a power supply section generally designated at 141, comprising a primary winding 144 of a transformer 143 connected by suitable conductors 145 and 146 to the source of alternating potential supplied to the recorder 32 through the link 31 from the receiver attachment 30. The conductors 145 and 146 are connected to the terminal strip 67*a* of the time mark radio 39. The conductors leading away from the terminal strip 67*a* and connected to the conductors 145 and 146 are also designated by the same reference numerals. Power is supplied to the primary winding 144 of the time mark radio 39 through any one of a plurality of parallel connected circuits. As illustrated, one side of the primary winding 144 is connected through the conductor 145, a conductor 147 and the conductor 64*b* directly to one side of the power supply to which the plug connector 46 of the monitored receiver 25 is connected. The other terminal of the primary winding 144 is connected to the other side of the alternating current circuit through one of the following three circuit paths: (*a*) a current path through a conductor 149, the contacts 150*a* of a thermal relay 150, the conductor 152, the conductor 153, a portion of the conductor 99, the fuse 98 and the conductor 64*a*; (*b*) a current path through the conductor 146, through a normally open cover lock switch 160, through a conductor 154, the conductor 153, a portion of the conductor 99, the fuse 98, and the conductor 64*a*; or (*c*) a current path through the conductor 146, the conductor 161, the cam switch 124, through a conductor 162, the conductor 154, the conductor 154, a portion of the conductor 99, the fuse 98, and the conductor 64*a*. The purpose of these parallel arranged circuits will become apparent as the following description proceeds.

The cam switch 124 is primarily for the purpose of permitting the fixed tuned receiver 39 to be turned off for substantial periods of time in order to increase the tube life of this receiver. With this arrangement the cam switch 124 turns on the time mark radio 139 for two or three minutes during each two-hour period. Actually the receiver 39 is illustrated as recording only the "sign on" time of the transmitter to which it is always tuned rather than the "sign off" time for reasons which were fully brought out in the above mentioned co-pending Rahmel application, Serial No. 762,962. Accordingly it is necessary in the event that the receiver 39 is turned on during one of these two or three minute intervals in each two-hour period and no signal is received from the station to which it is tuned that this receiver 39 remain turned on until the "sign on" time of this transmitting station so that a record indication of such "sign on" time may be made.

To this end the relay 100, which is shown in the position when the time mark radio 39 is either turned off or no carrier is received (actually the latter must be true in the schematic illustration since the switch 124 is shown in a closed position), is provided with a set of contacts 100*b* which are opened when the relay is deenergized or in other words when the time mark radio is off or no carrier is received. If the time mark Radio 39 is on during one of the two or three minute intervals during each two-hour period and no carrier is received no negative bias is applied to the grid of the control tube 136 and consequently the winding of the relay 100 is energized so as to open the contacts 100*a* and close the contacts 100*b*. When the contacts 100*b* are closed a resistor 170 associated with the thermal relay 150 is connected to the source 137 of +B potential so that after a short time delay the thermal relay 150 closes its contacts 150*a*. This completes one of the parallel energization circuits for the time mark radio 39 whereupon it will remain energized even though the cam switch 124 shortly thereafter opens the circuit through contacts 124*a* and 124*b*. The relay 100 will then remain energized until the "sign on" time of the transmitter to which the receiver 39 is tuned whereupon the receipt of a carrier signal will de-energize the relay 100.

The reason the thermal relay 150 is provided in this parallel circuit for energizing the primary winding 144 of the transformer 143 is to prevent momentary lapses in carrier from the transmitter to which the receiver 39 is tuned from causing the parallel circuit to be rendered effective through the closure of the contacts 100*b*. The third circuit for energizing the primary winding 144 is controlled by the cover switch 160 which is clearly shown in Fig. 4 and 1*b* of the drawings and which is closed when a cover or housing 171 of the recorder 32 shown in Fig. 2 of the drawings is removed. Removal of this cover 171 and consequent closure of the switch 160 automatically energizes the time mark radio to permit the field man to make the necessary calibrations without waiting for the cam switch 124, which may not close for almost two hours, to be energized.

The schematic diagram of the system illustrated in Figs. 1*a*, 1*b* and 1*c* also includes a transfer switch 172 best shown in Figs. 4 and 1*b* of the drawings which is adapted to engage either one of two contacts 172*a* and 172*b*. This transfer switch is actuated in dependence upon whether or not the magazine 36 is disposed in the magazine receptacle 37 of the recorder 32 or not. When the magazine 36 is in the magazine receptacle 37 the switch 172 is actuated to engage the contact 172*a* to complete the energization circuit for the filmdrive motor 120 from the conductors 64*a* and 64*b*. In other words it is undesirable to advance the film or record receiving element 38 when the magazine 36 for receiving the exposed film is not in position. When the magazine 36 is not in its film receiving position the switch 172 engages its contact 172*b* thereby transferring the power supplied to the motor 120 to a suitable audible signal means generally designated at 173 which produces an audible signal whenever the exposed magazine 36 is removed to encourage the collaborator to immediately replace it with a new magazine. This audible signal means is illustrated as a buzzer 173 supported from a bracket 174 attached to the housing section 110*a* as clearly disclosed in Fig. 4 of the drawings.

The recorder 32 in addition to the optical system described above and the electrical control circuits including the time mark radio 39 and the code commutator switch 35 comprises means for supplying exposed film 38 to the magazine 36. In addition, means are provided for releasing and ejecting the magazine from its receptacle 37 when it is desired to mail it to the analysis organization. As is best shown in Figs. 2 to 4 of the drawings, the recorder 32 preferably comprises a base 190 from which the time mark radio 39 and the housing sections 110*a* and 110*b* are supported. In addition, there is supported on the base 190 a housing section 191 defining a film storage chamber 192 and the magazine receptacle 37 therein.

It will be understood that in magazine arrangements for mailing the recorded information, the magazine, such as 36, might be of the type disclosed and claimed in the above-mentioned copending Rahmel application Serial No. 762,962 in which the record receiving element in the magazine is replaced by the analysis organization each time it receives the magazine. In other words, the record to be exposed is initially provided in the magazine and record indications are produced thereon while associated with the recorder. It will be understood that such a magazine must have substantial bulk in order to accommodate a sufficient supply of film or record receiving element to accommodate a predetermined calendar period. In addition, the magazine must include supply and take-up spools as well as means for transferring the film between the two spools. Since the cost of mailing the magazine to the analysis organization every few weeks, or perhaps even once a week, from one or two thousand homes becomes a substantial item, it is desirable for the magazine to be as small as possible and preferably comprise only a container for the exposed record receiving element. Preferably, therefore, the magazine 36 is more in the nature of the arrangement disclosed and claimed in copending Cordell application Serial No. 17,314, filed March 26, 1948 (now Patent No. 2,660,507), and assigned to the same assignee as the present application. The use of this type of magazine necessitates providing in the recorder 32 a storage supply chamber for unexposed record receiving element or film 38 which following exposure is supplied to the magazine 36. When it is desired to replace the magazine and mail the exposed record to the analysis organization, means must be provided for transferring all the exposed record receiving element to the magazine as well as to cut off the element 38 from the supply source so that the magazine 36 may be readily removed for mailing purposes.

Referring now to Figs. 2 and 3 of the drawings, it may be observed that the storage chamber 192 is primarily provided for receiving a large supply of the record receiving element 38. As illustrated, the chamber 192 is adapted to receive a supply spool 194 preferably adapted to hold a four-months' supply of film 38. This supply spool 194 is preferably rotatably mounted on a stub shaft 195 disposed within the chamber 192. To prevent unwinding of the film 38 from the spool 194 as a faster rate than is required by the friction drive roller 121 there is provided a braking member in the form of a pulley 196 rotatably mounted on the stub shaft 195. This pulley 196 is connected by means of a spring belt 197 with a stationary stud 198 fastened to one of the walls defining the chamber 192. The pulley 196 is preferably provided with a pair of driving prongs 199 insertable within cooperating openings in the spool 194. When the spool 194 is disposed in the position shown in Fig. 3 of the drawings it is drivingly related to the pulley 196 so that a braking force is applied by virtue of the spring belt 197.

In view of the fact that the record receiving element 38 has been specifically designated as photographic film, the chamber 192 must be a light tight chamber and to this end is closed by a suitable cover member 200. Preferably a sealing gasket 201 is interposed between the cover 200 and the housing section 191 to insure a light tight seal.

Figure 8:
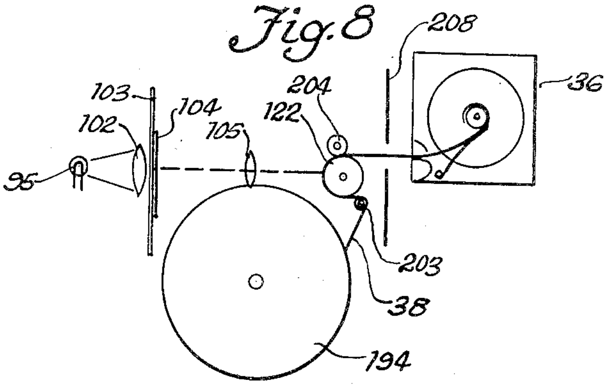
Figure 9:
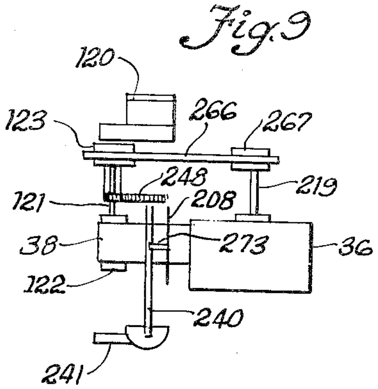
Figs. 9 and 10 are schematic side and top view diagrams similar to Figs. 7 and 8 illustrating the record receiving element cut off and magazine release mechanism embodied in the recorder of Figs. 2 to 4.
Figure 10:
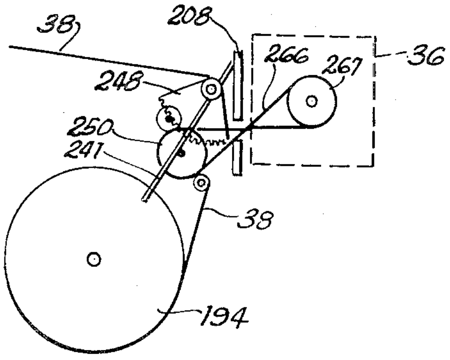

The film 38 is exposed to light from the optical system when disposed on the friction drive roller 122 as is best shown in Figs. 3 and 8 of the drawings. In other words, a portion of the surface of the friction drive roller 122 is disposed on a line extending from the light source 95 through the slit 104*a* in the target 104. The path of the recording element from the supply spool 194 to the magazine 36 is clearly evident from an examination of Figs. 3, 8 and 11 of the drawings. As illustrated, the film 38 passes from the supply spool 94 over a guide roller 203 disposed so that the film is caused to engage the friction drive roller 122 over a circumferential area of at least 180 degrees. To insure satisfactory movement of the film 38, a pressure roller 204 is preferably provided which is spring biased to press the film 38 against the friction drive roller 122. As illustrated, the pressure roller 204 is rotatably mounted on an arm 205 pivotally mounted within the chamber 192 and biased by a suitable spring means 206 into frictional engagement with the film passing around the friction roller 122. Preferably the roller 122 is provided with parallel rubber inserts to increase the driving friction.

In order to insure that the film 38 is properly disposed on the friction roller 122, it preferably passes between a pair of film guide prongs 207 disposed on either side of the pressure roller 204. The film also passes beneath a film cut-off knife 208, disposed in shearing engagement with a stationary shearing plate 209 mounted beneath the film, into the magazine chamber 37 from where it may enter the magazine 36 through a suitable light tight gate to be described hereinafter.

From the above description it will be apparent that the film drive motor 120 drivingly connected to the friction drive roller 122 causes the film 38 to move at a constant speed from the supply spool 194 around the friction drive roller 122 where it may be exposed to light from the source 95 and into the magazine 36 adjacent the cut-off knife 208. Since film has a substantial inherent rigidity, it is effectively pushed by the friction drive roller 122 into the magazine 36.

Figures 13, 14, 15, 16:
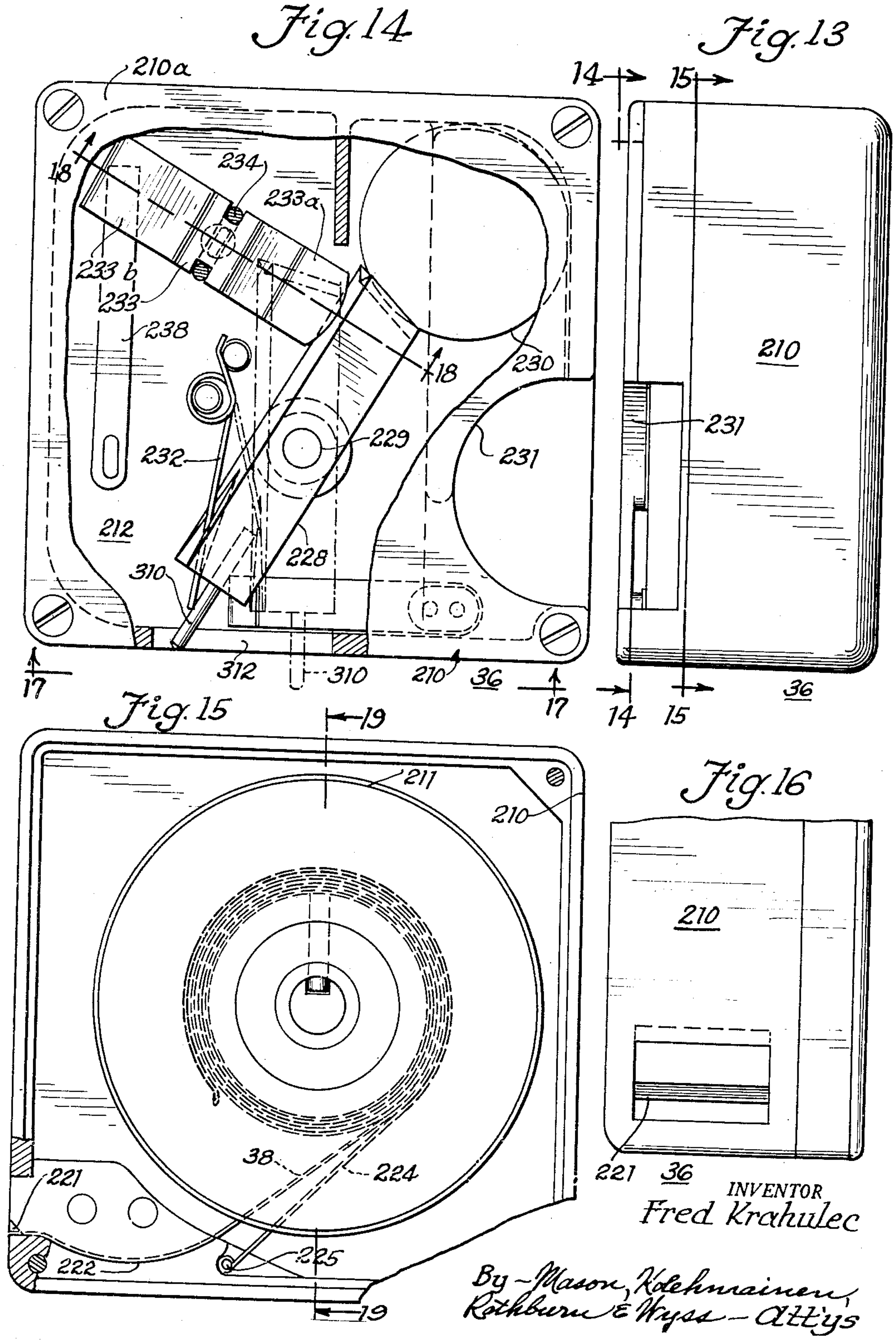
Fig. 13 is an enlarged end view of the magazine of Fig. 2 as viewed from the side which is visible when the magazine is disposed in the recorder.
Fig. 14 is a partial sectional view taken on line 14—14 of Fig. 13.
Fig. 15 is a sectional view taken on line 15—15 of Fig. 13.
Fig. 16 is a fragmentary view of the magazine of Fig. 13 showing the opening through which the record receiving element enters the magazine.
Figure 17:
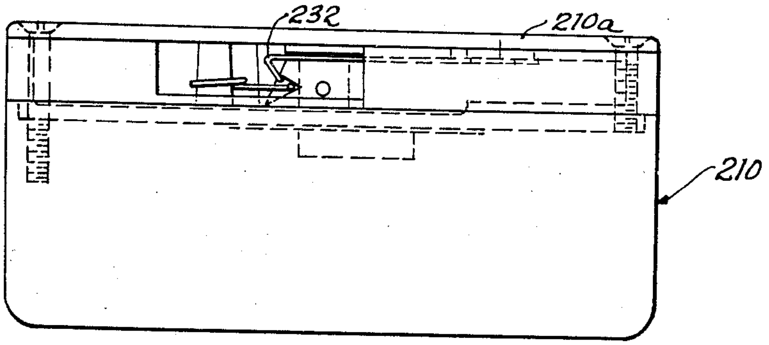
Fig. 17 is an end view taken in the direction of the arrows 17—17 of Fig. 14, assuming

As illustrated in the drawings and specifically in Figs. 14 to 20 of the drawings, the magazine 36 is a very simple magazine which need weigh only a relatively few ounces for receiving the film which has been exposed. It requires only a take-up spool. As best shown in Figs. 14 to 20 of the drawings, the magazine 36 preferably comprises a rectangular housing 210 which is divided into a film receiving chamber 211 and a coin discharging chamber 22 which are best shown in Fig. 19 of the drawings. The housing 210 is preferably divided into several sections as indicated in Fig. 19 so as to afford access to both the film receiving chamber 211 and the coin discharge chamber 212. Disposed within the film receiving chamber 211 is a film spool 213 drivingly related to a suitable drive shaft 214 by a pin or key 216. The end of the drive shaft 214 is provided with an enlarged flange 214*a* disposed in a recess 217 in the magazine housing 210. The flange 214*a* is provided with a plurality of openings 218 for receiving cooperating pins associated with a driving member 219 shown in phantom in Fig. 19 of the drawings. It will be understood that the driving member 219, as is apparent from Fig. 11 of the drawings, is associated with the recorder 32 in such a manner that when the magazine 36 is disposed within the receptacle 37, that the driving member 219 is in driving engagement with the spool shaft 214 so as to cause the exposed film supplied to the magazine from the friction drive roller 122 to be wound around the supply spool 213. As best shown in Figs. 15 and 16, the chamber 211 is provided with a light tight film gate 221 through which exposed film enters the spool chamber 211. This light tight gate 221 is a relatively simple gate comprising a curved narrow path 222 through which the exposed film 38 passes in entering the magazine 36. If desired, the walls defining this narrow curved slot 222 may be covered with a suitable flock, black felt or the like.

When the magazine is first inserted into the magazine receptacle 37, it contains no film since it is sent by the analysis organization to the collaborator's home in an empty condition in so far as the film 38 is concerned. Consequently, means must be provided to cause the film 38 as it is initially pushed through the light gate 222 to wrap itself around the spool 213. To this end there is provided a guide spring 224 which has one end suitably fastened by means of a pin 225 within the chamber 211 and the other end is wrapped substantially around the spool 213. In addition, the space within the magazine for the spool 213 is substantially the configuration of the spool so that the only place the film may travel is between the spool flanges beneath the guide spring 224. If desired, the flanges of the spool 213 may be tapered so as to be spaced apart at the base thereof to a slightly less degree than the width of the film thereby gripping the film initially to wind it on the spool. As more and more exposed film is wound upon the spool 213, the guide spring 224 expands. Preferably the magazine 36 is capable of receiving at least a two-weeks' supply of film therein.

It will be apparent that when the magazine is received by the analysis organization that the exposed film 38 may readily be removed for processing the same, whereupon the empty magazine may again be returned to the home of one of the collaborators to receive subsequently exposed film having recorded thereon the tuning conditions of wave signal receivers such as 25.

In accordance with the arrangement disclosed and broadly claimed in copending Krahulec and Nielson applications Serial Nos. 57,328 and 57,294, both filed October 29, 1948, now Patents Nos. 2,593,572 and 2,593,593, respectively, and both assigned to the same assignee as the present application, the magazine 36 includes a coin discharge chamber whereby one or more coins are automatically discharged therefrom when the magazine 36 is placed in its receptacle 37 in the recorder 32. This arrangement provides an incentive to the collaborator to insert the new magazine as soon as it is received after first removing the magazine then in the recorder and sending the latter to the analysis organization for processing. If the collaborator promptly returns the magazine containing the exposed film each time that he receives a new magazine several coins such, for example, as several quarters, may be dispensed to him from the magazine 36 upon insertion of the same into the receptacle 37. If he is not prompt in returning the magazine containing the exposed film to the analysis organization, perhaps no coin or only a single coin may be dispensed to him. This arrangement in practice has proved very satisfactory. As illustrated in the drawings, there is disposed in the coin discharge chamber 212 a pivotally mounted coin retaining lever 228 having a somewhat V-shaped end 228*a* for wedging one or two quarters indicated at 230 in Fig. 14 of the drawings into a corner of the coin discharge chamber 212. As long as the coin retaining lever 228 is in the solid line position shown in Fig. 14, the coin is wedged into a corner of the chamber 212 in a firm manner and preferably in a manner sufficiently firm to prevent rattling thereof during the mailing operation. The coin discharge chamber 212 is provided with an arcuate opening and cutaway portion 231 into which the coins drop by gravity when the coin retaining element 228 is pivoted about its axis 229 from the solid line to the dotted line position shown. Preferably the coin retaining lever 228 is biased to its dotted line position by means of a spring 232.

For the purpose of maintaining the coin retaining lever 228 in its coin retaining position, there is provided a pivotally mounted latching lever 233 pivotally mounted within the chamber 212 as indicated at 234 and as is best shown in Figs. 14 and 18 of the drawings. The end 233*a* of the latching lever 233 is adapted to engage the coin retaining lever 228 to hold the same in its coin retaining position as shown in Fig. 14. If, however, the latching lever 233 is moved from the solid line position shown in Fig. 18 to the dotted line position there shown, the end 233*a* moves clear of the coin retaining lever 228 and permits the latter to pivot in a counterclockwise direction as viewed in Fig. 14 of the drawings under the bias spring 232. A suitable spring 238 is provided to bias the latching lever 233 into its latching position. The coins 230 drop by gravity through the coin discharge opening where the coins are readily available to the collaborator. As illustrated in Fig. 2 of the drawings, the walls defining the receptacle 37 into which the magazine 36 is inserted are provided with a cutaway portion 37*a* corresponding to the coin discharge opening 231 so that no difficulty will be encountered by the collaborator in grasping the coins which have been freed for the collaborator's use.

As has been fully disclosed in the above-mentioned Nielson and Krahulec applications Serial Nos. 57,294 and 57,328, the end 233*b* of the latching lever 233 is preferably formed of magnetic material so that it may be attracted by a suitable permanent magnet or the like, not shown (disposed within the housing section 191), when the magazine 36 is fully inserted in the receptacle 37. The cover portion 210*a* of the coin chamber 212 of the magazine 36 is preferably formed of non-magnetic material so as not to interfere with the magnetic attraction between the permanent magnet, not shown and the magnetic extension 233*b* of the latching lev_r 233.

In view of the fact that the film 38 is exposed while on the friction drive roller 122, a portion of the exposed film is always disposed outside the magazine 36. Obviously, when the magazine is to be mailed to the analysis organization, it is desirable that all of the exposed film be moved into the magazine before the film 38 is cut off from the remaining film within the supply chamber 192. Accordingly, there is provided a manually actuable mechanism for moving the exposed portion of the film 38 into the magazine 36 before the magazine is removed from the receptacle 37. This mechanism also simultaneously actuates the cutoff knife 208 during the latter portion of the operation thereof to cut off the film after all the exposed portion thereof has been moved into the magazine 36.

As is best shown in Fig. 11 of the drawings the mechanism for performing the functions enumerated in the preceding paragraph comprises a manually actuable shaft 240 which extends outside the housing section 191 so that an exterior lever 241 may be attached thereto. The lever 241 may be rigidly attached to the shaft 240, but in the event that there are children in the collaborator's home who might inadvertently actuate the lever 241, the latter preferably comprises a cup-shaped housing portion for receiving therein a combined torsion and compression spring 242 as well as the end of the shaft 240 extending outside the housing section 191. The cup-shaped portion of the lever 241 further includes a pair of diametrically opposed lugs 242*a* for engaging the ends of a pin 244 extending through the shaft 240. Driving engagement between the lever 241 and the shaft 240 requires compression of the spring 242 so that the pin 244 engages the lugs 242*a*. Consequently inadvertent actuation of the shaft 240 is not likely to result. A suitable screw 245 may be employed to fasten the lever 241 to the shaft 240, a long screw being employed in the event that the compression spring 242 is to be operative for causing normal non-driving relationship between the lever 241 and the shaft 240, whereas a short screw is all that is required for positively relating the lever 241 and the shaft 240. The torsional effect of the spring 242 always returns the lever 241 against a suitable stop 280 whereby the shaft 240 cannot be rotated in the reverse direction through manual actuation of the lever 241.

For the purpose of manually moving the exposed portion of the film or record receiving element 38 into the magazine 36 when it is desired to remove the magazine from the magazine receptacle 37, there is provided a segmental gear 248 suitably mounted on the shaft 240. This segmental gear has an angular extent of the order of 160 degrees and is drivingly engaged with a pinion 249 floatingly mounted on the shaft section 121*a* associated with the friction drive roller 122. By virtue of the clutch arrangement 123 to be described hereinafter, angular movement of the shaft 240 will result in movement of the film drive or friction roller 122. In a commercial embodiment of the present invention an angular movement of the order of 104 degrees of the lever 241 caused between two and two and one half inches of film 38 to be moved into the magazine 36 through the light tight gate 221.

Figure 12:
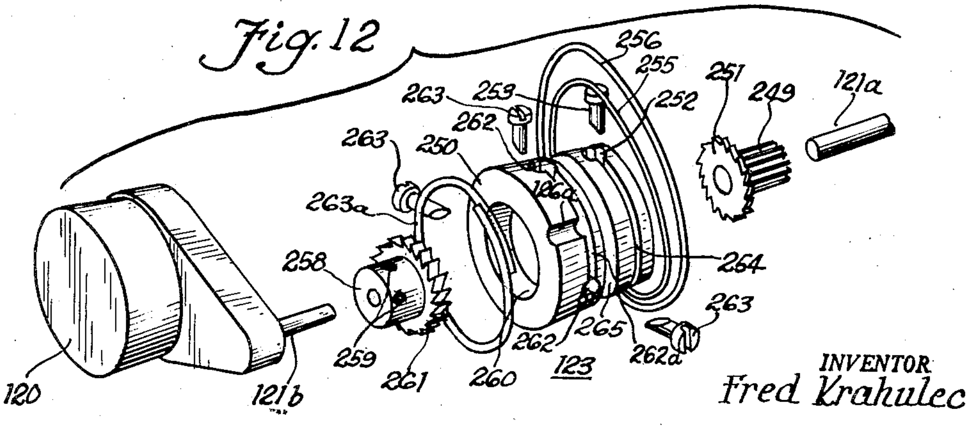
Fig. 12 is an exploded perspective view of some of the elements shown in Fig. 11.

It will be understood that the double overrunning clutch mechanism 123 is necessary to permit movement of the friction drive roller 122 in response to actuation of the lever 241 even though the motor 120 is drivingly connected to the same friction drive roller. Furthermore when the motor 120 is driving the friction drive roller 122 it is essential that no interference from the segmental gear 248 and meshing pinion 249 be encountered. It is for this reason that the pinion 249 floats on the shaft section 121*a* and is connected to drive the shaft 121*a* through the double overrunning clutch 123 which is best shown in Fig. 12 of the drawings. As illustrated the double overrunning clutch 123 essentially comprises a barrel like member 250 having a central bore for receiving the shaft section 121*a*. This shaft section is rigidly fastened to the member 250 as by set screws or the like so that rotation of the member 250 automatically causes rotation of the shaft section 121*a*.

The end of the barrel like member 250 with which the shaft section 121*a* is associated is counterbored slightly to receive therein a ratchet wheel 251 preferably formed as an integral part of pinion 249 and freely floating on the shaft section 121*a*. The barrel like member 250 is also provided with a plurality of circumferentially disposed pawl receiving openings 252 into which pawl members 253 are inserted to engage the ratchet teeth of the ratchet wheel 251, when the ratchet wheel is rotated in a counterclockwise direction as viewed in Fig. 12 of the drawings. Preferably the member 250 is provided with a shallow circumferential groove 254 which connects the pawl receiving openings 252 and which is adapted to receive therein a pawl spring ring 255. If desired, a retainer ring 256 may be provided which is adapted to rest on the outside of the grove 254. It will be apparent that rotation of the pinion 249 in a counterclockwise direction as viewed in Figs. 11 and 12 will cause the barrel like member 250 to rotate by virtue of the pawls 253 and ratchet wheel 251 with the consequent rotation of the shaft 240. The barrel 250, however, may also be rotated by applying a force directly thereto to rotate the shaft section 121*a* without affecting the ratchet wheel 251 and the pinion 249 so long as the member 250 rotates in a counterclockwise direction as viewed in Fig. 12.

For the purpose of rotating the member 250 in response to rotation of the shaft section 121*b* of the motor 120 there is provided a clutch bushing 258 which is fastened as by set screws 259 for rotation with the shaft section 121*b*. The clutch bushing 258 includes a ratchet wheel 261 which is insertable within a counterbore 260 defined in the end of the barrel like member 250 adjacent the motor 120. The barrel like member 250 is further provided with a plurality of circumferentially disposed pawl receiving openings 262 into which pawl members 263 are inserted to engage the ratchet teeth of the ratchet wheel 261 when the latter is rotated in a counterclockwise direction as viewed in Fig. 12 of the drawings. Preferably the member 250 is provided with a shallow circumferential groove 262*a* which connects the pawl receiving openings 262 and which is adapted to receive therein a pawl spring ring 263*a*. It will be apparent that counterclockwise rotation of the ratchet 261 as viewed in Fig. 12 of the drawings will cause rotation of the barrel 250 and consequently the shaft section 121*a* in the same direction, but will not affect ratchet 251. For the other direction of rotation, however, relative movement between the barrel like member 250 and the ratchet 261 may occur without any substantial frictional retardation. Thus it is apparent that the double overrunning clutch 123 permits the motor 120 to drive the friction roller 122 at a constant speed without interference from the ratchet wheel 251. When, however, the manual lever 241 is actuated then the ratchet 261 permits free movement of the barrel like member 250 relative to the bushing 258, with the consequent rotation of the friction roller through operation of the pinion 249 and associated segmental gear 248. It should be noted that the barrel like member 250 is provided with a notch 126*a* which as was described above controls the time mark radio switch 124.

To drive the shaft 219 the barrel like member 250 is provided with a spring belt groove 265 for receiving a spring belt 266 cooperating with a pulley 267 mounted on the shaft 219 as is best shown in Fig. 11 of the drawings. Any rotation of the member 250 will cause rotation of the film take-up spool drive shaft 219 whether such rotation is caused by the motor 120 or actuation of the lever 241.

In accordance with the present invention the cut-off knife 208 is also actuated by the operation of the manual lever 241 after all the film 38 which has been exposed is moved into the magazine 36. To this end there is fixed to the shaft 240 a gear 270 which drivingly engages a gear 271 mounted on a stub shaft 272 having a knife actuating pin 273 thereon. Normally the cut-off knife 208 is disposed just above the film 38 and is biased to its non-cutting position by a suitable spring 275 best shown in dotted lines in Fig. 3 of the drawings. However, the pin 273 is so located as to positively move the cut-off knife 208 downward against the bias of the spring 275. Since the shearing surface 209 is disposed immediately below the film 38 entering the magazine 36 and beneath the knife 208, downward movement of the cut-off knife 208 will shear the film 38 so that the portion in the magazine 36 is severed from the portion on the film supply spool 194 within the chamber 192. The operation of the cut-off knife 208 occurs after all of the exposed film has moved into the magazine 36. However, continued movement of the lever 241 to the end of its stroke will cause all of the film which is severed from the supply on the spool 194 to move into the magazine 36 so that no film will be exposed to light when the magazine 36 is removed from the recorder. A spring bias, not shown, is provided to return the shaft 240 to its initial position and to this end the stop 280 is provided on the cover 200 to limit the return movement of the lever 241. This spring bias could comprise a torsion spring associated with the shaft 240.

In accordance with the present invention the manual actuation of the film drive or friction roller 122 and the film cut-off knife 208 also preferably actuates a magazine release mechanism whereby the drive shaft 219 for the take up spool 213 within the magazine 36 is released from its driving engagement with this spool and the magazine is mechanically ejected from the magazine receptacle 37 to a sufficient extent that it may then readily be removed therefrom by manually grasping the same. To this end the take up spool drive shaft 219 is mounted for limited reciprocal movement along its longitudinal axis whereupon the driving pins associated with the shaft 219 may be removed from or inserted in the openings 218 in the flange 214*a*. A suitable flange 290 is fastened to the shaft 219 and a spring 291 normally biases the shaft 219 in a direction along its longitudinal axis drivingly to engage the flange 214*a* on the film take up spool 213 within the magazine 36.

For the purpose of withdrawing the shaft 219 from driving engagement with the flange 214*a* there is provided a member 293 mounted for limited pivotal movement from the wall 294, best shown in Fig. 4 of the drawings, defining the housing section 191. The pivotal axis of the member 293 is perpendicular to the axis of the shaft 219. Attached to the pivotal member 293 is a forked extension 295 which normally has the forked end thereof extending with the prongs of the fork one on either side of the shaft 219. Upon pivotal movement of the member 293 the forked extension 295 engages the flange 290 on the shaft 219 to cause longitudinal movement of the shaft with the consequent disengagement of the drive between the take up spool 213 within the magazine 36 and the shaft 219.

In order to cause actuation of the pivotal member 293 when the film has been severed from the roll and is all disposed within the magazine 36 the pivotal member 293 is provided with a lateral extension 293*a* having a cam follower pin 296 adapted to be engaged by a cam surface 297 attached to the segmental gear 248. As the segmental gear reaches its limit of movement in a clockwise direction as viewed in Fig. 11 of the drawings, the cam 297 engages the pin 296 to lift the same with the resultant movement of the member 293 and the consequent disengagement of the shaft 219 with the take up spool 213 in the magazine 36.

For the purpose of also ejecting the magazine 36 when the driving shaft 219 has been withdrawn from driving engagement with the takeup spool 213, there is provided a magazine ejector lever 300 which is pivotally mounted as indicated at 301 to the wall 294 of the housing section 191. A suitable spring 302 normally biases the ejector lever 300 in a counterclockwise direction as viewed in Fig. 11. A suitable pin 303 extends laterally from the free end of the ejector lever 300 and protrudes through an arcuate opening, not shown, into the magazine receptacle 37. When the lever 300 is free to pivot under the force of the biasing spring 302, the pin 303 moves to engage a magazine as it is disposed within the receptacle and move it out of its completely inserted position so that it may be readily removed from the chamber 37.

It will be understood that it is undesirable for the ejector lever 300 to perform its ejecting operation until the film 38 has been cut off and the shaft 219 has been withdrawn from driving engagement with the take up spool within the magazine. Accordingly the segmental gear 248 has been provided on one side thereof with an arcuate cam member 306 which cooperates with a pin 307 extending from the lever 300 on the opposite side thereof from which the pin 303 extends. The mechanism shown in Fig. 11 of the drawings shows the pin 307 retained by the cam surface 306. When the segmental gear 248 has been rotated in a clockwise direction to a sufficient extent the pin 307 moves beyond the end of the cam 306 so as to move along an abrupt surface 306*a* thereof with the result that the ejector lever 300 is free to pivot under the force of the spring 302 with the resultant movement of the magazine 36 by the pin 303.

It will be understood that following the operation of the magazine ejector mechanism that the collaborator can readily remove the magazine containing the exposed film and replace it with an empty magazine. It is at this time that the magazine switch 172 referred to above is actuated. It will be observed from Fig. 4 that the magazine switch is positioned so as to be engageable by a portion of the segmental gear 248 to actuate the same when the ejector mechanism has been actuated. A new magazine should immediately be inserted to open the switch 172 which both deenergizes the motor 120 and energizes the audible signal 173.

For the purpose of making sure that the collaborator does not reinsert the magazine with the exposed film rather than the empty magazine, each magazine is provided with an interference member 310 best shown in Figs. 14 and 19 of the drawings. This interference member 310 comprises merely an extension of the coin retaining lever 228 which extension is movable in a suitable slot 312 defined in the magazine housing. When the magazine has been inserted and the coin release mechanism actuated, the coin retaining lever 228 moves to the dotted position shown in Fig. 14 of the drawings and in this dotted position the interference member 310 protrudes outside the magazine housing to a sufficient extent as to interfere with the reinsertion of the magazine into the magazine receptacle 37. Accordingly if the collaborator should try to reinsert the improper magazine into the magazine receptacle 37 he would be prevented from doing so by the interference member 10 engaging the bottom wall of the magazine receiving chamber 37. The empty magazine, however, which has been supplied by the analysis organization to the collaborator can readily be inserted and upon fully inserting the same the magazine ejector pin 303 is moved so as to move the ejector lever 302 sufficiently to cause pin 307 to again engage the cam 306 with the result that the manually actuated shaft 240 is restored to its initial position. Also upon complete insertion of the magazine 36, the coin discharge mechanism is actuated so that the collaborator will be supplied with one or more coins as an incentive to replace the magazines promptly and mail them to the analysis organization.

In view of the detailed description included above the operation of the system and apparatus of the present invention will be understood by those skilled in the art. The analysis organization will initially install the equipment in association with wave signal receivers located in the homes of collaborators. The apparatus associated directly with the receiver is relatively small so as to be unnoticeable. The recording apparatus will produce a record in binary code of the type shown in Fig. 21 whereby information with respect to the listening habits of a plurality of wave signal receiver users may be recorded on a single record receiving element. Actually the typical record shown in Fig. 21 is the record after the film has been developed and this record lends itself very well to automatic decoding dependent upon the light transmission through the film 38. It will be understood that the analysis organization can develop such film in a simple and well understood manner just as movie film is now developed in commercial establishments throughout the country by means of a continuous process.

The record by virtue of the time mark radio will contain accurate time information and on a very small film space there may be recorded information with respect to at least three wave signal receivers, each tunable to fifteen amplitude modulation and fifteen frequency modulation stations. Upon the receipt of a new magazine from the analysis organization the collaborator may be encouraged by virtue of the possibility of receiving one or more coins to insert the newly received magazine into the recorder. He must first, of course, remove the old magazine which is readily accomplished through manipulation of the lever 241 which not only moves all of the exposed film into the magazine and cuts it off from the supply roll but also initiates ejection of the magazine from the recorder so that it may readily be removed by the collaborator. At the same time the audible signal 173 is rendered effective to cause the collaborator to insert the empty magazine as soon as possible to discontinue the audible signal. Upon inserting the new magazine the audible signal is deenergized, the film drive motor is reenergized and the ejector mechanism and cut-off knife are restored to their initial conditions for subsequent operation upon a subsequent magazine replacement.

While there has been shown and described a particular embodiment of the present invention, it is not desired that the invention be limited to the construction shown and described, for it will, of course, be obvious to those skilled in the art, that changes and modifications may be made without departing from the invention and it is therefore aimed in the appended claims to cover all such changes and modifications as fall within the true spirit and scope of this invention.

What is claimed as new and desired to be secured by Letters Patent of the United States is:

1. A recorder comprising a housing, means defining a light tight recording chamber in said housing, a magazine receptacle in said housing disposed adjacent said chamber, a magazine capable of being inserted into said receptacle, means for supporting a light sensitive record receiving element in said chamber, rotatable means for moving said record receiving element out of said chamber and into said magazine, a first means for operating said rotatable means, means for effectively producing record indications on said element while in said chamber, and a second means for actuating said rotatable means, a double overrunning clutch interposed between said rotatable means and said first means and second means respectively whereby either said first means or said second means may actuate said rotatable means without interference.

2. A recorder comprising a housing, means defining a recording chamber in said housing, a magazine receptacle in said housing disposed adjacent said chamber, a magazine capable of being inserted into said receptacle, means for supporting a record receiving element in said chamber, rotatable means for moving said record receiving element out of said chamber and into said magazine, a motor for operating said rotatable means, means for effectively producing record indications on said element while in said chamber, a second means for operating said rotatable means, a double overrunning clutch interposed between said rotatable means and said motor and second means respectively whereby either said motor or said second means may actuate said rotatable means without interference.

3. A recorder comprising a housing, means defining a recording chamber in said housing, a magazine receptacle in said housing disposed adjacent said chamber, a magazine capable of being inserted into said receptacle, means for supporting a record receiving element in said chamber, friction drive means for moving said record receiving element out of said chamber and into said magazine, motive means for operating said friction drive means in a predetermined manner with respect to time, means for effectively producing record indications on said element while in said chamber, a pivotal lever for actuating said friction drive means, a double overrunning clutch interposed between said friction drive means and said motive means and pivotal lever respectively whereby said friction drive means may be operated either by said motive means or by pivotal movement of said lever without interfering with each other.

4. A recorder comprising a housing, means defining a recording chamber in said housing, a magazine receptacle in said housing disposed adjacent said chamber, a magazine capable of being inserted into said receptacle, means for supporting a record receiving element in said chamber, means for moving said record receiving element out of said chamber and into said magazine, motor means for actuating said last mentioned means, means for effectively producing record indications on said element while in said chamber, manually operable means for actuating said means for moving said element, means for severing the portion of said element disposed in said magazine from the portion remaining in said chamber, ejecting means for ejecting said magazine from said receptacle, means responsive to actuation of said manually operable means for rendering ineffective said motor means and actuating said cutting means and ejecting means, audible signal means associated with said housing, and means responsive to ejection of said magazine from said receptacle for rendering said audible signal means effective.

5. A recorder comprising a housing, means defining a recording chamber in said housing, a magazine receptacle in said housing disposed adjacent said chamber, a magazine capable of being inserted into said receptacle, means for supporting a record receiving element in said chamber, means for moving said record receiving element out of said chamber and into said magazine, means for ejecting said magazine from said receptacle, an interference member associated with said magazine and capable when rendered effective to prevent insertion of said magazine into said receptacle, means for maintaining said interference member ineffective, and means responsive to the insertion of said magazine into said receptacle for releasing said last mentioned means whereby upon removal of said magazine from said receptacle said interference member prevents reinsertion thereof.

6. A recorder comprising a housing, a magazine receptacle in said housing, a magazine capable of being inserted into said receptacle, means for supporting a record receiving element in said magazine, means for effectively producing record indications on said record receiving element, means for ejecting said magazine from said receptacle, an interference member associated with said magazine and capable when rendered effective to prevent insertion of said magazine into said receptacle, means for maintaining said interference member ineffective, and means responsive to insertion of said magazine into said receptacle for releasing said last mentioned means whereby upon removal of said magazine from said receptacle said interference member prevents reinsertion thereof.

7. A recorder comprising a housing, a magazine receptacle in said housing, a magazine capable of being inserted into said receptacle, means for producing record indications on a movable record receiving element disposed in said housing or magazine, means for ejecting said magazine from said receptacle, an interference member associated with said magazine and capable when rendered effective to prevent insertion of said magazine into said receptacle, means for maintaining said interference member ineffective, and means responsive to insertion of said magazine into said receptacle for releasing said last mentioned means whereby upon ejection of said magazine it cannot be reinserted into said receptacle.

8. A recorder comprising a housing, means defining a recording chamber in said housing, a magazine receptacle in said housing disposed adjacent said chamber, a magazine capable of being inserted into said receptacle, means for supporting a record receiving element in said chamber, means for moving said record receiving element out of said chamber and into said magazine, means for ejecting said magazine from said receptacle, coin or token retaining means disposed in said magazine, an interference member associated with said retaining means and capable when rendered effective to prevent insertion of said magazine into said receptacle, means for normally latching said coin or token retaining means to securely hold a coin or token associated therewith and to maintain said interference member ineffective, and means responsive to insertion of said magazine into said receptacle for effecting release of said coin or token and rendering effective said interference member whereby upon ejection of said magazine it cannot be reinserted into said receptacle.

9. A recorder comprising a housing, means defining a recording chamber in said housing, a magazine receptacle in said housing disposed adjacent said chamber, a mailable magazine capable of being inserted into said receptacle, means for supporting a record receiving element in said chamber, first means for moving said record receiving element out of said chamber and into said magazine, means for effectively producing record indications on said element while in said chamber, second means for moving said element into said magazine, cutting means for severing the portion of said element disposed in said magazine from the portion remaining in said chamber, ejecting means for ejecting said magazine from said receptacle, and a single manual means actuable to render ineffective said first means, render effective said second means, actuate said cutting means and actuate said ejecting means.

10. A recorder comprising a housing, means defining a recording chamber in said housing, a magazine receptacle in said housing disposed adjacent said chamber, a mailable magazine capable of being inserted into said receptacle, means for supporting a record receiving element in said chamber, means for moving said record receiving element out of said chamber and into said magazine, means for effectively producing record indications on said element while in said chamber, cutting means for severing the portion of said element disposed in said magazine from the portion remaining in said chamber, ejecting means for ejecting said magazine from said receptacle, and a single manual means actuable to render ineffective said means for moving said element and render effective said cutting and ejecting means.

11. A recorder comprising a housing, means defining a recording chamber in said housing, a magazine receptacle in said housing disposed adjacent said chamber, a mailable magazine capable of being inserted into said receptacle, means for supporting a record receiving element in said chamber, means for moving said record receiving element out of said chamber and into said magazine, motor means for actuating said last mentioned means, means for effectively producing record indications on said element while in said chamber, manually operable means for actuating said means for moving said element, means for severing the portion of said element disposed in said magazine from the portion remaining in said chamber, ejecting means for ejecting said magazine from said receptacle, and means responsive to actuation of said manually operable means for rendering ineffective said motor means and actuating said cutting means and ejecting means.

12. A recorder comprising a housing, means defining a recording chamber in said housing, a magazine receptacle in said housing disposed adjacent said chamber, a mailable magazine capable of being inserted into said receptacle, means for supporting a record receiving element in said chamber, rotatable means in frictional engagement with said record receiving element for moving said record receiving element out of said chamber and into said magazine, motor means for actuating said rotatable means, means for effectively producing record indications on said element while in said chamber, manually operable means including a pivotal lever for actuating said rotatable means for moving said element, means for severing the portion of said element disposed in said magazine from the portion remaining in said chamber, ejecting means for ejecting said magazine from said receptacle, and means responsive to movement of said pivotal lever for rendering inffective said motor means and actuating said cutting means and ejecting means.

13. A recorder comprising a housing, means defining a recording chamber in said housing, a magazine receptacle in said housing disposed adjacent said chamber, a mailable magazine capable of being inserted into said receptacle, means for supporting a record receiving element in said chamber, first means for moving said record receiving element out of said chamber and into said magazine, means for effectively producing record indications on said element while in said chamber, second means for moving said element into said magazine, cutting means for severing the portion of said element disposed in said magazine from the portion remaining in said chamber, ejecting means for ejecting said magazine from said receptacle, and a single manual means actuable to render ineffective said first means, render effective said second means, actuate said cutting means and actuate said ejecting means.

14. In a recorder of the photographic type, the combination with a casing having a recess adapted to receive a magazine and having a drive member adapted to engage the take-up of said magazine and guide means for directing a sensitized material to said recess, of a locking means for holding said magazine in said recess, a severing means between said guide means and said recess capable of severing said sensitized material, a magazine ejecting means, a movable mechanism operatively connected to said drive member and operable to move said sensitized material past said severing means and for moving the severed sensitized material into said magazine, and an actuating means operatively connected to said locking means and said severing means and movable with said mechanism for actuating said severing means after a portion of said sensitized material has been moved past said severing means and for actuating said locking means after the severed sensitized material has been moved into said magazine to permit said ejecting means to eject said magazine from said recess.

15. In a record producing apparatus of the type employing a flexible recording medium, the combination with a removable casing having a chamber for receiving said medium and motor driven means for directing said medium into said chamber, of cutting means externally disposed with respect to said casing and separate therefrom for severing said medium externally of said casing, means separate from said cutting means for advancing said severed portion of said medium into said chamber after said medium has been severed by said cutting means, and a single manually operable control means for sequentially operating said cutting means and then said advancing means.

16. In a record producing apparatus of the type employing a flexible recording strip, the combination of a chamber, first means for moving said strip from a supply into said chamber, second means for advancing a predetermined portion of said strip into said chamber, severing means independent of said advancing means for separating said supply from the strip disposed in said chamber, and a single manually operable control means for sequentially operating said advancing means and said severing means to cause a predetermined length of said strip to be moved into said chamber and for thereafter causing said severing means to sever said strip.

17. The combination set forth in claim 16 including means operable by said control means for moving the severed portion of said strip into said chamber after said severing means has been actuated.

References Cited in the file of this patent

UNITED STATES PATENTS

| | | |
|---|---|---|
| 894,173 | Doremus | July 21, 1908 |
| 1,907,105 | Haworth | May 2, 1933 |
| 2,095,849 | Wittel | Oct. 12, 1937 |
| 2,142,853 | Landrock | Jan. 3, 1939 |
| 2,298,574 | Lockhart | Oct. 13, 1942 |
| 2,338,180 | Harrison | Jan. 4, 1944 |
| 2,425,758 | Saunders | Aug. 19, 1947 |
| 2,545,196 | Curioni | Mar. 13, 1951 |
| 2,588,954 | Bornemann | Mar. 11, 1952 |

FOREIGN PATENTS

| | | |
|---|---|---|
| 337,029 | Great Britain | Oct. 22, 1930 |